United States Patent
Zhang

(10) Patent No.: US 10,299,273 B2
(45) Date of Patent: May 21, 2019

(54) NETWORK DEVICE, TERMINAL, AND METHOD FOR DETERMINING AVAILABILITY OF COMMUNICATION SPECTRUM

(71) Applicant: Huawei Technologies Co., Ltd., Shenzhen, Guangdong, P.R. (CN)

(72) Inventor: Lili Zhang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 97 days.

(21) Appl. No.: 15/510,512

(22) PCT Filed: Sep. 11, 2014

(86) PCT No.: PCT/CN2014/086295
§ 371 (c)(1),
(2) Date: Mar. 10, 2017

(87) PCT Pub. No.: WO2016/037339
PCT Pub. Date: Mar. 17, 2016

(65) Prior Publication Data
US 2017/0303281 A1    Oct. 19, 2017

(51) Int. Cl.
*H04W 72/04*    (2009.01)
*H04W 72/00*    (2009.01)
(Continued)

(52) U.S. Cl.
CPC ....... *H04W 72/0453* (2013.01); *H04W 16/14* (2013.01); *H04W 72/042* (2013.01);
(Continued)

(58) Field of Classification Search
CPC combination set(s) only.
See application file for complete search history.

(56) References Cited

U.S. PATENT DOCUMENTS

2012/0040620 A1    2/2012  Fu et al.
2013/0324174 A1*   12/2013 Mueck ................. H04W 16/14
                                                     455/509
(Continued)

FOREIGN PATENT DOCUMENTS

CN    101541062 A    9/2009
CN    102450050 A    5/2012
(Continued)

OTHER PUBLICATIONS

Haitao Wu et al., "IEEE 802.11 Distributed Coordination Function (DCF): Analysis and Enhancement", IEEE, 2002, 5 pages.
(Continued)

*Primary Examiner* — Charles C Jiang
*Assistant Examiner* — Thad N Defauw

(57) ABSTRACT

A first network device includes: a transceiver, configured to send control information to a terminal, to instruct the terminal to access a second network device and query whether the second network device allows the first network device to use a first spectrum; and a processor, configured to: determine a query result of the terminal, and determine, according to the query result, whether the first spectrum is available, where the first spectrum is an unlicensed spectrum for the first network device.

16 Claims, 7 Drawing Sheets

(51) Int. Cl.
*H04W 16/14* (2009.01)
*H04W 74/00* (2009.01)

(52) U.S. Cl.
CPC ... *H04W 72/0413* (2013.01); *H04W 72/0446* (2013.01); *H04W 74/004* (2013.01); *H04W 74/006* (2013.01)

(56) References Cited

U.S. PATENT DOCUMENTS

| | | | | |
|---|---|---|---|---|
| 2014/0038655 A1* | 2/2014 | Garnett | ............... | H04W 16/14 455/509 |
| 2015/0098397 A1* | 4/2015 | Damnjanovic | ....... | H04W 74/08 370/329 |
| 2015/0156650 A1* | 6/2015 | Li | ................. | H04W 72/085 455/67.11 |

FOREIGN PATENT DOCUMENTS

| | | |
|---|---|---|
| CN | 103532924 A | 1/2014 |
| WO | 2013/143053 A1 | 10/2013 |

OTHER PUBLICATIONS

Hitachi Ltd, "Hitachi perspectives on LTE-U," 3GPP workshop on LTE in unlicensed spectrum RWS-140017, Jun. 13, 2014, XP050774764, 12 pages.

ETSI MCC, "Report of 3GPP workshop on LTE in unlicensed spectrum," 3GPP workshop on LTE-U, RWS-140032, Sophia Antipolis, France, Jun. 13, 2014, XP050868323, 17 pages.

* cited by examiner

NETWORK DEVICE, TERMINAL, AND METHOD FOR DETERMINING AVAILABILITY OF COMMUNICATION SPECTRUM

CROSS REFERENCE TO RELATED APPLICATIONS

The present application claims priority under 35 U.S.C. § 365 to International Patent Application No. PCT/CN2014/086295 filed Sep. 11, 2014 which is incorporated herein by reference into the present disclosure as if fully set forth herein.

TECHNICAL FIELD

The present invention relates to the field of wireless communications technologies, and in particular, to a network device, a terminal, and a method for determining availability of a communication spectrum.

BACKGROUND

A Wireless Fidelity (Wireless Fidelity, Wifi) system uses an unlicensed spectrum (unlicensed spectrum), and a Long Term Evolution (Long Term Evolution, LTE) system uses licensed 800 M, second-generation (2nd Generation, 2G), and 3.5-generation (3.5 Generation, 3.5G) spectrums.

Considering that licensed spectrum resources used in LTE are limited, an existing technology is as follows: When a Wi-Fi system does not effectively use its spectrum, the LTE system perceives usage of the spectrum of the Wi-Fi system and uses the spectrum. This technology is referred to as an unlicensed LTE (unlicensed LTE, U-LTE) technology.

When an LTE base station fails to effectively perceive a surrounding Wi-Fi AP, a hidden terminal problem (hidden terminal problem, HTP) may occur. For details, refer to FIG. 1.

In FIG. 1, because a signal loss during penetration is relatively large, an outdoor LTE base station fails to detect a signal transmitted by an indoor Wi-Fi AP. The LTE base station communicates with user equipment (User Equipment, UE). However, UE2 is close to the Wi-Fi AP. Consequently, a downlink signal transmitted by the Wi-Fi AP causes interference to communication between the LTE base station and the UE2, affecting communication between the LTE base station and the UE2.

In conclusion, when a network device fails to effectively perceive another network device, but uses a communication spectrum of the another network device to communicate with a terminal, communication between the network device and the terminal may be interfered with by the another network device.

SUMMARY

Embodiments of the present invention provide a network device, a terminal, and a method for determining availability of a communication spectrum, so as to resolve the following problem: When a network device fails to effectively perceive another network device, but uses a communication spectrum of the another network device to communicate with a terminal, communication between the network device and the terminal may be interfered with by the another network device.

According to a first aspect, an embodiment of the present invention provides a first network device, including:

a transceiving module, configured to send control information to a terminal, where the control information is used for instructing the terminal to access a second network device and query whether the second network device allows the first network device to use a first spectrum; and a processing module, configured to: determine a query result of querying, by the terminal, whether the second network device allows the first network device to use the first spectrum, and determine, according to the query result, whether the first spectrum is available, where the first spectrum is an unlicensed spectrum for the first network device.

With reference to the first aspect, in a first possible implementation manner, the control information includes configuration information and activation information, the configuration information includes information about a physical resource and/or a physical signal used when the terminal accesses the second network device, and the activation information is used for instructing the terminal to access the second network device according to the configuration information; and the transceiving module is specifically configured to: send the configuration information to the terminal, and then send the activation information to the terminal when the first network device needs to use the first spectrum to communicate with the terminal; or the control information includes the configuration information, and the transceiving module is specifically configured to send the configuration information to the terminal when the first network device needs to use the first spectrum to communicate with the terminal.

With reference to the first possible implementation manner of the first aspect, in a second possible implementation manner, the physical signal includes an access preamble Preamble.

With reference to the first possible implementation manner of the first aspect, in a third possible implementation manner, the information about the physical signal is pre-agreed between the first network device and the second network device, or is preconfigured in an operation and maintenance OAM manner and is notified to the first network device and the second network device.

With reference to the first possible implementation manner of the first aspect, in a fourth possible implementation manner, the configuration information further includes:

query result feedback manner information used for indicating whether a manner of feeding back the query result by the terminal is an explicit feedback manner or an implicit feedback manner.

With reference to the fourth possible implementation manner of the first aspect, in a fifth possible implementation manner, if the query result feedback manner information indicates that the manner of feeding back the query result by the terminal is an explicit feedback manner, the transceiving module is further configured to receive query result information returned by the ten terminal; and the processing module is specifically configured to determine the query result according to the query result information.

With reference to the fourth possible implementation manner of the first aspect, in a sixth possible implementation manner, if the query result feedback manner information indicates that the manner of feeding back the query result by the terminal is an implicit feedback manner, the transceiving module is further configured to receive query result information returned by the terminal; and the processing module is specifically configured to:

if the transceiving module does not receive, within first duration after sending the control information, the query result information returned by the terminal, determine that the query result is that the first spectrum is available to the first network device; or if the transceiving module receives, within first duration after sending the control information, the query result information returned by the terminal, and the query result information indicates that the first network device is not allowed to use the first spectrum, determine that the query result is that the first spectrum is unavailable to the first network device.

With reference to the fifth possible implementation manner of the first aspect or the sixth possible implementation manner of the first aspect, in a seventh possible implementation manner, if the processing module determines that the first spectrum is unavailable, the query result information includes:

first time information used for instructing the first network device to send the control information next time.

With reference to the fifth possible implementation manner of the first aspect or the sixth possible implementation manner of the first aspect, in an eighth possible implementation manner, the query result information includes:

second time information used for indicating an available time of the first spectrum.

With reference to the eighth possible implementation manner of the first aspect, in a ninth possible implementation manner, the second time information includes:

a start moment T1 at which the first spectrum is available, available duration D1 for which the first spectrum is available starting from the start moment T1, and unavailable duration D2 for which the first spectrum is unavailable starting from an end moment of the available duration D1; and the processing module is specifically configured to determine that the first spectrum is available within the duration D1 starting from the start moment T1 and that the first spectrum is unavailable within the duration D2 following the duration D1, where D1+D2 is a cycle.

With reference to the fifth possible implementation manner of the first aspect or the sixth possible implementation manner of the first aspect, in a tenth possible implementation manner, the query result information includes:

frequency information used for indicating an available frequency on the first spectrum.

With reference to the tenth possible implementation manner of the first aspect, in an eleventh possible implementation manner, the frequency information includes:

a carrier identifier of an available carrier on the first spectrum; or a carrier bitmap, where the carrier bitmap is used for indicating whether each carrier on the first spectrum is available.

With reference to the eleventh possible implementation manner of the first aspect, in a twelfth possible implementation manner, if the control information includes the configuration information and the activation information, before sending the activation information, the transceiving module is further configured to:

send a first receive threshold to the terminal, where the first receive threshold is used for instructing the terminal to receive the activation information when the following condition is met:

a difference between strength of a received signal that is transmitted by the first network device and strength of a signal that is transmitted by the second network device, and that is received on the first spectrum is less than the first receive threshold.

With reference to the first possible implementation manner of the first aspect, in a thirteenth possible implementation manner, if the control information includes the configuration information, before sending the configuration information, the transceiving module is further configured to:

send a second receive threshold to the terminal, where the second receive threshold is used for instructing the terminal to receive the configuration information when the following condition is met:

a difference between strength of a received signal that is transmitted by the first network device and strength of a signal that is transmitted by the second network device and that is received on the first spectrum is less than the second receive threshold.

With reference to the first possible implementation manner of the first aspect, in a fourteenth possible implementation manner, the transceiving module is specifically configured to:

send the control information to the terminal, and identify the control information by using a first identifier of the terminal, where the first identifier is used for indicating the terminal, and the control information is sent to the terminal and is used for instructing the terminal to access the second network device and query whether the second network device allows the first network device to use the first spectrum.

With reference to the fourteenth possible implementation manner of the first aspect, in a fifteenth possible implementation manner, if the control information includes the configuration information and the activation information, the transceiving module is specifically configured to: send the activation information on a physical downlink control channel, and scramble cyclic redundancy check CRC information in the activation information by using the first identifier of the terminal.

With reference to the fourteenth possible implementation manner of the first aspect, in a sixteenth possible implementation manner, if the control information includes the configuration information, the transceiving module is specifically configured to: send the configuration information on a physical downlink control channel, and scramble CRC information in the configuration information by using the first identifier of the terminal.

With reference to the first possible implementation manner of the first aspect, in an eighteenth possible implementation manner, the configuration information further includes a network device identifier that is of the second network device and that is used for instructing the terminal to access a network device identified by the network device identifier.

With reference to any one of the first aspect, or the first possible implementation manner to the seventeenth possible implementation manners of the first aspect, in an eighteenth possible implementation manner, the transceiving module is further configured to:

send an occupation factor of the first network device to the second network device, and instruct the second network device to determine, according to an occupation factor of the second network device and the occupation factor of the first network device, whether to allow the first network device to use the first spectrum, where an occupation factor of a network device is in inverse proportion to duration of occupying the first spectrum by the network device, and is in direct proportion to spectrum efficiency of using the first spectrum by the network device.

According to a second aspect, an embodiment of the present invention provides a terminal, including:

a transceiving module, configured to receive control information sent by a first network device; and a processing module, configured to: according to the control information, access a second network device and query whether the second network device allows the first network device to use a first spectrum, where the transceiving module is further configured to receive feedback information returned by the second network device in response to the query;

the processing module is further configured to determine, according to the feedback information, whether the first network device is allowed to use the first spectrum; and/or the processing module is further configured to determine query result information of the query according to the feedback information, and the transceiving module is further configured to send the query result information determined by the processing module to the first network device, where the first spectrum is an unlicensed spectrum for the first network device.

With reference to the second aspect, in a first possible implementation manner, the control information includes configuration information and activation information, the configuration information includes information about a physical resource and/or a physical signal used when the terminal accesses the second network device, and the activation information is used for instructing the terminal to access the second network device according to the configuration information; the transceiving module is specifically configured to receive and store the configuration information; and the processing module is specifically configured to access the second network device according to the configuration information after the transceiving module receives the activation information; or the control information includes the configuration information, and the processing module is specifically configured to access the second network device according to the configuration information received by the transceiving module.

With reference to the first possible implementation manner of the second aspect, in a second possible implementation manner, the physical signal includes:

an access preamble Preamble.

With reference to the first possible implementation manner of the second aspect, in a third possible implementation manner, the information about the physical signal is pre-agreed between the first network device and the second network device, or is preconfigured in an operation and maintenance OAM manner and is notified to the first network device and the second network device.

With reference to the first possible implementation manner of the second aspect, in a fourth possible implementation manner, the configuration information further includes:

query result feedback manner information used for indicating whether a manner of feeding back a query result by the terminal is an explicit feedback manner or an implicit feedback manner.

With reference to the fourth possible implementation manner of the second aspect, in a fifth possible implementation manner, if the query result feedback manner information indicates that the manner of feeding back the query result by the terminal is an explicit feedback manner, the processing module determines the query result information of the query according to the feedback information, and the transceiving module sends the query result information determined by the processing module to the first network device.

With reference to the fourth possible implementation manner of the second aspect, in a sixth possible implementation manner, if the query result feedback manner information indicates that the manner of feeding back the query result by the terminal is an implicit feedback manner, the processing module is configured to determine, according to the feedback information, whether the first network device is allowed to use the first spectrum; and if the processing module determines that the first network device is allowed to use the first spectrum, as for whether the first network device is allowed to use the first spectrum, the transceiving module remains silent to the first network device and does not send information to the first network device within first duration after the first network device sends the control information; or if the processing module determines that the first network device is not allowed to use the first spectrum, the processing module determines the query result information of the query according to the feedback information, and the transceiving module sends the query result information to the first network device within first duration after the transceiving module receives the control information.

With reference to the fifth possible implementation manner or the sixth possible implementation manner of the second aspect, in a seventh possible implementation manner, the processing module is specifically configured to:

use the feedback information as the query result information.

With reference to the seventh possible implementation manner of the second aspect, in an eighth possible implementation manner, the feedback information further includes:

first time information used for instructing the first network device to send the control information next time.

With reference to the seventh possible implementation manner of the second aspect, in a ninth possible implementation manner, the feedback information includes:

second time information used for indicating an available time of the first spectrum.

With reference to the ninth possible implementation manner of the second aspect, in a tenth possible implementation manner, the second time information includes:

a start moment T1 at which the first spectrum is available, available duration D1 for which the first spectrum is available starting from the start moment T1, and unavailable duration D2 for which the first spectrum is unavailable starting from an end moment of the available duration D1.

With reference to the seventh possible implementation manner of the second aspect, in an eleventh possible implementation manner, the feedback information includes:

frequency information used for indicating an available frequency on the first spectrum.

With reference to the eleventh possible implementation manner of the second aspect, in a twelfth possible implementation manner, the frequency information includes:

a carrier identifier of an available carrier on the first spectrum; or a carrier bitmap, where the carrier bitmap is used for indicating whether each carrier on the first spectrum is available.

With reference to the first possible implementation manner of the second aspect, in a thirteenth possible implementation manner, if the control information includes the configuration information and the activation information, the transceiving module is further configured to: before the terminal receives the activation information, receive a first receive threshold sent by the first network device; and the transceiving module is specifically configured to receive the activation information when a difference between strength of a received signal that is transmitted by the first network device and strength of a signal that is transmitted by the second network device and that is received on the first spectrum is less than the first receive threshold.

With reference to the first possible implementation manner of the second aspect, in a fourteenth possible implementation manner, if the control information includes the configuration information, the transceiving module is further configured to: before receiving the configuration information, receive a second receive threshold sent by the first network device; and the transceiving module is specifically configured to receive the configuration information when the following condition is met:

a difference between strength of a signal that is transmitted by the first network device and that is received by the terminal and strength of a signal that is transmitted by the second network device and that is received on the first spectrum is less than the second receive threshold.

With reference to the first possible implementation manner of the second aspect, in a fifteenth possible implementation manner, the transceiving module is specifically configured to:

receive the control information, and determine that the control information is identified by a first identifier of the terminal, where the first identifier is used for indicating the terminal, and the control information is sent to the terminal and is used for instructing the terminal to access the second network device and query whether the second network device allows the first network device to use the first spectrum.

With reference to the fifteenth possible implementation manner of the second aspect, in a sixteenth possible implementation manner, if the control information includes the configuration information and the activation information, the transceiving module is specifically configured to: receive the activation information on a physical downlink control channel, descramble CRC information in the activation information by using the first identifier of the terminal, and if the descrambling succeeds, determine that the activation information is identified by the first identifier of the terminal.

With reference to the fifteenth possible implementation manner of the second aspect, in a seventeenth possible implementation manner, if the control information includes the configuration information, the transceiving module is specifically configured to: receive the configuration information on a physical downlink control channel, descramble CRC information in the configuration information by using the first identifier of the terminal, and if the descrambling succeeds, determine that the configuration information is identified by the first identifier of the terminal.

With reference to the first possible implementation manner of the second aspect, in an eighteenth possible implementation manner, the configuration information further includes a network device identifier that is of the second network device and that is used for instructing the terminal to access a network device identified by the network device identifier.

With reference to any one of the second aspect, or the first possible implementation manner to the eighteenth possible implementation manners of the second aspect, in a nineteenth possible implementation manner, the transceiving module is specifically configured to:

receive the feedback information sent by the second network device by using an access response message.

According to a third aspect, an embodiment of the present invention provides a second network device, including:

a transceiving module, configured to detect that a terminal accesses the second network device and queries whether the second network device allows the first network device to use a first spectrum; and a processing module, configured to determine whether to allow the first network device to use the first spectrum, where the transceiving module is further configured to send feedback information to the terminal in response to the query, where the feedback information is used for indicating whether the second network device allows the first network device to use the first spectrum, and the first spectrum is an unlicensed spectrum for the first network device.

With reference to the third aspect, in a first possible implementation manner, determine, according to an occupation factor of the second network device, whether to allow the first network device to use the first spectrum; or determine, according to an occupation factor of the second network device and an occupation factor of the first network device, whether to allow the first network device to use the first spectrum, where an occupation factor of a network device is in inverse proportion to duration of occupying the first spectrum by the network device, and is in direct proportion to spectrum efficiency of using the first spectrum by the network device.

With reference to the first possible implementation manner of the third aspect, in a second possible implementation manner, the processing module is specifically configured to:

when a difference between the occupation factor of the second network device and the occupation factor of the first network device is less than a preset occupation factor difference threshold, determine to allow the first network device to use the first spectrum; or when a difference between the occupation factor of the second network device and the occupation factor of the first network device is not less than a preset occupation factor difference threshold, determine not to allow the first network device to use the first spectrum.

With reference to the first possible implementation manner or the second possible implementation manner of the third aspect, in a third possible implementation manner, the transceiving module is further configured to:

before the processing module determines whether to allow the first network device to use the first spectrum, receive the occupation factor that is of the first network device and that is sent by the first network device.

With reference to the third aspect, in a fourth possible implementation manner, the terminal accesses the second network device after receiving control information that is sent by the first network device and that is used for instructing the terminal to access the second network device and query whether the second network device allows the first network device to use the first spectrum; and the feedback information includes first time information used for instructing the first network device to send the control information next time.

With reference to the third aspect, in a fifth possible implementation manner, the feedback information includes:

second time information used for indicating an available time of the first spectrum.

With reference to the fifth possible implementation manner of the third aspect, in a sixth possible implementation manner, the second time information includes:

a start moment T1 at which the first spectrum is available, available duration D1 for which the first spectrum is available starting from the start moment T1, and unavailable duration D2 for which the first spectrum is unavailable starting from an end moment of the available duration D1.

With reference to the third aspect, in a seventh possible implementation manner, the feedback information includes:

frequency information used for indicating an available frequency on the first spectrum.

With reference to the seventh possible implementation manner of the third aspect, in an eighth possible implementation manner, the frequency information includes:

a carrier identifier of an available carrier on the first spectrum; or a carrier bitmap, where the carrier bitmap is used for indicating whether each carrier on the first spectrum is available.

With reference to any one of the third aspect, or the first possible implementation manner to the eighth possible implementation manners of the third aspect, in a ninth possible implementation manner, the transceiving module is specifically configured to send the feedback information by using an access response message.

According to a fourth aspect, an embodiment of the present invention provides a first network device, including:

a transceiving module, configured to send control information to a terminal, where the control information is used for instructing the terminal to access a second network device and instruct the second network device to stop using a first spectrum; and a processing module, configured to: after the transceiving module sends the control information, use the first spectrum to perform communication, where the first spectrum is an unlicensed spectrum for the first network device.

With reference to the fourth aspect, in a first possible implementation manner, the control information includes configuration information and activation information, the configuration information includes information about a physical resource and/or a physical signal used when the terminal accesses the second network device, and the activation information is used for instructing the terminal to access the second network device according to the configuration information; and the transceiving module is specifically configured to: send the configuration information to the terminal, and then send the activation information to the terminal when the first network device needs to use the first spectrum to communicate with the terminal; or the control information includes the configuration information, and the transceiving module is specifically configured to send the configuration information to the terminal when the first network device needs to use the first spectrum to communicate with the terminal.

With reference to the first possible implementation manner of the fourth aspect, in a second possible implementation manner, the physical signal includes:

an access preamble Preamble.

According to a fifth aspect, an embodiment of the present invention provides a terminal, including:

a transceiving module, configured to receive control information sent by a first network device, where the control information is used for instructing the terminal to access a second network device and instruct the second network device to stop using a first spectrum; and a processing module, configured to: according to the control information, access the second network device and instruct the second network device to stop using the first spectrum, where the first spectrum is an unlicensed spectrum for the first network device.

With reference to the fifth aspect, in a first possible implementation manner, the control information includes configuration information and activation information, the configuration information includes information about a physical resource and/or a physical signal used when the terminal accesses the second network device, and the activation information is used for instructing the terminal to access the second network device according to the configuration information; the transceiving module is specifically configured to receive and store the configuration information; and the processing module is specifically configured to access the second network device according to the configuration information after the transceiving module receives the activation information; or the control information includes the configuration information, and the processing module is specifically configured to access the second network device according to the configuration information received by the transceiving module.

With reference to the first possible implementation manner of the fifth aspect, in a second possible implementation manner, the physical signal includes an access preamble Preamble.

According to a sixth aspect, an embodiment of the present invention provides a method for determining availability of a communication spectrum, including:

sending, by a first network device, control information to a terminal, where the control information is used for instructing the terminal to access a second network device and query whether the second network device allows the first network device to use a first spectrum;

determining, by the first network device, a query result of querying, by the terminal, whether the second network device allows the first network device to use the first spectrum; and determining, by the first network device according to the query result, whether the first spectrum is available, where the first spectrum is an unlicensed spectrum for the first network device.

With reference to the sixth aspect, in a first possible implementation manner, the control information includes configuration information and activation information, the configuration information includes information about a physical resource and/or a physical signal used when the terminal accesses the second network device, and the activation information is used for instructing the terminal to access the second network device according to the configuration infatuation; and that the first network device sends the control infatuation to the terminal includes: sending, by the first network device, the configuration information to the terminal, and then sending the activation information to the terminal when the first network device needs to use the first spectrum to communicate with the terminal; or the control information includes the configuration information, and that the first network device sends the control information to the terminal includes: sending, by the first network device, the configuration information to the ten final when the first network device needs to use the first spectrum to communicate with the terminal.

With reference to the first possible implementation manner of the sixth aspect, in a second possible implementation manner, the physical signal includes an access preamble Preamble.

With reference to the first possible implementation manner of the sixth aspect, in a third possible implementation manner, the information about the physical signal is pre-agreed between the first network device and the second network device, or is preconfigured in an operation and maintenance OAM manner and is notified to the first network device and the second network device.

With reference to the first possible implementation manner of the sixth aspect, in a fourth possible implementation manner, the configuration information further includes:

query result feedback manner information used for indicating whether a manner of feeding back the query result by the terminal is an explicit feedback manner or an implicit feedback manner.

With reference to the fourth possible implementation manner of the sixth aspect, in a fifth possible implementation manner, if the query result feedback manner information indicates that the manner of feeding back the query result by the terminal is an explicit feedback manner, that the first network device determines the query result includes:

receiving, by the first network device, query result information returned by the terminal; and determining, by the first network device, the query result according to the query result information.

With reference to the fourth possible implementation manner of the sixth aspect, in a sixth possible implementation manner, if the query result feedback manner information indicates that the manner of feeding back the query result by the terminal is an implicit feedback manner, that the first network device determines the query result includes:

if the first network device does not receive, within first duration after sending the control information, query result information returned by the terminal, determining, by the first network device, that the query result is that the first spectrum is available to the first network device; or if the first network device receives, within first duration after sending the control information, query result information returned by the terminal, and the query result information indicates that the first network device is not allowed to use the first spectrum, determining, by the first network device, that the query result is that the first spectrum is unavailable to the first network device.

With reference to the fifth possible implementation manner of the sixth aspect or the sixth possible implementation manner of the sixth aspect, in a seventh possible implementation manner, if the first network device determines that the first spectrum is unavailable, the query result information includes:

first time information used for instructing the first network device to send the control information next time.

With reference to the fifth possible implementation manner of the sixth aspect or the sixth possible implementation manner of the sixth aspect, in an eighth possible implementation manner, the query result information includes:

second time information used for indicating an available time of the first spectrum.

With reference to the eighth possible implementation manner of the sixth aspect, in a ninth possible implementation manner, the second time information includes:

a start moment T1 at which the first spectrum is available, available duration D1 for which the first spectrum is available starting from the start moment T1, and unavailable duration D2 for which the first spectrum is unavailable starting from an end moment of the available duration D1; and the determining, by the first network device, the query result according to the query result information includes:

determining, by the first network device, that the first spectrum is available within the duration D1 starting from the start moment T1 and that the first spectrum is unavailable within the duration D2 following the duration D1, where D1+D2 is a cycle.

With reference to the fifth possible implementation manner of the sixth aspect or the sixth possible implementation manner of the sixth aspect, in a tenth possible implementation manner, the query result information includes:

frequency information used for indicating an available frequency on the first spectrum.

With reference to the tenth possible implementation manner of the sixth aspect, in an eleventh possible implementation manner, the frequency information includes:

a carrier identifier of an available carrier on the first spectrum; or a carrier bitmap, where the carrier bitmap is used for indicating whether each carrier on the first spectrum is available.

With reference to the first possible implementation manner of the sixth aspect, in a twelfth possible implementation manner, if the control information includes the configuration information and the activation information, before the activation information is sent, the method further includes:

sending a first receive threshold to the terminal, where the first receive threshold is used for instructing the terminal to receive the activation information when the following condition is met:

a difference between strength of a received signal that is transmitted by the first network device and strength of a signal that is transmitted by the second network device and that is received on the first spectrum is less than the first receive threshold.

With reference to the first possible implementation manner of the sixth aspect, in a thirteenth possible implementation manner, if the control information includes the configuration information, before the configuration information is sent, the method further includes:

sending a second receive threshold to the terminal, where the second receive threshold is used for instructing the terminal to receive the configuration information when the following condition is met:

a difference between strength of a received signal that is transmitted by the first network device and strength of a signal that is transmitted by the second network device and that is received on the first spectrum is less than the second receive threshold.

With reference to the first possible implementation manner of the sixth aspect, in a fourteenth possible implementation manner, the sending, by a first network device, control information to a terminal includes:

sending, by the first network device, the control information to the terminal, and identifying the control information by using a first identifier of the terminal, where the first identifier is used for indicating the terminal, and the control information is sent to the terminal and is used for instructing the terminal to access the second network device and query whether the second network device allows the first network device to use the first spectrum.

With reference to the fourteenth possible implementation manner of the sixth aspect, in a fifteenth possible implementation manner, if the control information includes the configuration information and the activation information, the sending, by the first network device, the activation information to the terminal includes: sending, by the first network device, the activation information on a physical downlink control channel; and the identifying, by the first network device, the control information by using a first identifier of the terminal includes:

scrambling, by the first network device, cyclic redundancy check CRC information in the activation information by using the first identifier of the terminal.

With reference to the fourteenth possible implementation manner of the sixth aspect, in a sixteenth possible implementation manner, if the control information includes the configuration information, the sending, by the first network device, the configuration information to the terminal includes: sending the configuration information on a physical downlink control channel; and the identifying, by the first network device, the control information by using a first identifier of the terminal includes:

scrambling, by the first network device, CRC information in the configuration information by using the first identifier of the terminal.

With reference to the first possible implementation manner of the sixth aspect, in an eighteenth possible implementation manner, the configuration information further includes a network device identifier that is of the second network device and that is used for instructing the terminal to access a network device identified by the network device identifier.

With reference to any one of the sixth aspect, or the first possible implementation manner to the seventeenth possible implementation manners of the sixth aspect, in an eighteenth possible implementation manner, the method further includes:

sending, by the first network device, an occupation factor of the first network device to the second network device, and instructing the second network device to determine, according to an occupation factor of the second network device and the occupation factor of the first network device, whether to allow the first network device to use the first spectrum, where an occupation factor of a network device is in inverse proportion to duration of occupying the first spectrum by the network device, and is in direct proportion to spectrum efficiency of using the first spectrum by the network device.

According to a seventh aspect, an embodiment of the present invention provides a method for determining availability of a communication spectrum, including:

receiving, by a terminal, control information sent by a first network device;

according to the control information, accessing, by the terminal, a second network device and querying whether the second network device allows the first network device to use a first spectrum;

receiving, by the terminal, feedback information returned by the second network device in response to the query;

determining, by the terminal according to the feedback information, whether the first network device is allowed to use the first spectrum; and/or determining, by the terminal, query result information of the query according to the feedback information, and sending the determined query result information to the first network device, where the first spectrum is an unlicensed spectrum for the first network device.

With reference to the seventh aspect, in a first possible implementation manner, the control information includes configuration information and activation information, the configuration information includes information about a physical resource and/or a physical signal used when the terminal accesses the second network device, and the activation information is used for instructing the terminal to access the second network device according to the configuration information; and that the terminal receives the control information, and accesses the second network device according to the control information includes: receiving and storing, by the terminal, the configuration information, and accessing the second network device according to the configuration information after receiving the activation information; or the control information includes the configuration information, and that the terminal receives the control information, and accesses the second network device according to the control information includes: receiving, by the terminal, the configuration information, and accessing the second network device according to the configuration information.

With reference to the first possible implementation manner of the seventh aspect, in a second possible implementation manner, the physical signal includes an access preamble Preamble.

With reference to the first possible implementation manner of the seventh aspect, in a third possible implementation manner, the information about the physical signal is preagreed between the first network device and the second network device, or is preconfigured in an operation and maintenance OAM manner and is notified to the first network device and the second network device.

With reference to the first possible implementation manner of the seventh aspect, in a fourth possible implementation manner, the configuration information further includes:

query result feedback manner information used for indicating whether a manner of feeding back a query result by the terminal is an explicit feedback manner or an implicit feedback manner.

With reference to the fourth possible implementation manner of the seventh aspect, in a fifth possible implementation manner, if the query result feedback manner information indicates that the manner of feeding back the query result by the terminal is an explicit feedback manner, the terminal determines the query result information of the query according to the feedback information, and sends the determined query result information to the first network device.

With reference to the fourth possible implementation manner of the seventh aspect, in a sixth possible implementation manner, if the query result feedback manner information indicates that the manner of feeding back the query result by the terminal is an implicit feedback manner, the terminal determines, according to the feedback information, whether the first network device is allowed to use the first spectrum; and if the terminal determines that the first network device is allowed to use the first spectrum, as for whether the first network device is allowed to use the first spectrum, the terminal remains silent to the first network device and does not send information to the first network device within first duration after the first network device sends the control information; or if the terminal determines that the first network device is not allowed to use the first spectrum, the terminal determines the query result information of the query according to the feedback information, and sends the query result information to the first network device within first duration after the terminal receives the control information.

With reference to the fifth possible implementation manner or the sixth possible implementation manner of the seventh aspect, in a seventh possible implementation manner, that the terminal determines the query result information according to the feedback information includes:

using, by the terminal, the feedback information as the query result information.

With reference to the seventh possible implementation manner of the seventh aspect, in an eighth possible implementation manner, the feedback information further includes:

first time information used for instructing the first network device to send the control information next time.

With reference to the seventh possible implementation manner of the seventh aspect, in a ninth possible implementation manner, the feedback information includes second time information used for indicating an available time of the first spectrum.

With reference to the ninth possible implementation manner of the seventh aspect, in a tenth possible implementation manner, the second time information includes:

a start moment T1 at which the first spectrum is available, available duration D1 for which the first spectrum is available starting from the start moment T1, and unavailable duration D2 for which the first spectrum is unavailable starting from an end moment of the available duration D1.

With reference to the seventh possible implementation manner of the seventh aspect, in an eleventh possible implementation manner, the feedback information includes frequency information used for indicating an available frequency on the first spectrum.

With reference to the eleventh possible implementation manner of the seventh aspect, in a twelfth possible implementation manner, the frequency information includes:

a carrier identifier of an available carrier on the first spectrum; or a carrier bitmap, where the carrier bitmap is used for indicating whether each carrier on the first spectrum is available.

With reference to the first possible implementation manner of the seventh aspect, in a thirteenth possible implementation manner, if the control information includes the configuration information and the activation information, before the terminal receives the activation information, the method further includes:

receiving, by the terminal, a first receive threshold sent by the first network device; and that the terminal receives the activation information includes:

receiving, by the terminal, the activation information when a difference between strength of a received signal that is transmitted by the first network device and strength of a signal that is transmitted by the second network device and that is received on the first spectrum is less than the first receive threshold.

With reference to the first possible implementation manner of the seventh aspect, in a fourteenth possible implementation manner, if the control information includes the configuration information, before the terminal receives the configuration information, the method further includes:

receiving, by the terminal, a second receive threshold sent by the first network device; and that the terminal receives the configuration information includes: receiving, by the terminal, the configuration information when the following condition is met:

a difference between strength of a signal that is transmitted by the first network device and that is received by the terminal and strength of a signal that is transmitted by the second network device and that is received on the first spectrum is less than the second receive threshold.

With reference to the first possible implementation manner of the seventh aspect, in a fifteenth possible implementation manner, that the control information is received includes:

receiving the control information, and determining that the control information is identified by a first identifier of the terminal, where the first identifier is used for indicating the terminal, and the control information is sent to the terminal and is used for instructing the terminal to access the second network device and query whether the second network device allows the first network device to use the first spectrum.

With reference to the fifteenth possible implementation manner of the seventh aspect, in a sixteenth possible implementation manner, if the control information includes the configuration information and the activation information, that the terminal receives the activation information includes: receiving, by the terminal, the activation information on a physical downlink control channel; and that the terminal determines that the control information is identified by the first identifier of the terminal includes:

descrambling, by the terminal, CRC information in the activation information by using the first identifier of the terminal, and if the descrambling succeeds, determining that the activation information is identified by the first identifier of the terminal.

With reference to the fifteenth possible implementation manner of the seventh aspect, in a seventeenth possible implementation manner, if the control information includes the configuration information, that the terminal receives the configuration information includes: receiving, by the terminal, the configuration information on a physical downlink control channel; and that the terminal determines that the control information is identified by the first identifier of the terminal includes:

descrambling, by the terminal, CRC information in the configuration information by using the first identifier of the terminal, and if the descrambling succeeds, determining that the configuration information is identified by the first identifier of the terminal.

With reference to the first possible implementation manner of the seventh aspect, in an eighteenth possible implementation manner, the configuration information further includes a network device identifier that is of the second network device and that is used for instructing the terminal to access a network device identified by the network device identifier.

With reference to any one of the seventh aspect, or the first possible implementation manner to the eighteenth possible implementation manners of the seventh aspect, in a nineteenth possible implementation manner, that the terminal receives the feedback information includes:

receiving, by the terminal, the feedback information sent by the second network device by using an access response message.

According to an eighth aspect, an embodiment of the present invention provides a method for determining availability of a communication spectrum, including:

detecting, by a second network device, that a terminal accesses the second network device and queries whether the second network device allows the first network device to use a first spectrum;

determining, by the second network device, whether to allow the first network device to use the first spectrum; and sending, by the second network device, feedback information to the terminal in response to the query, where the feedback information is used for indicating whether the second network device allows the first network device to use the first spectrum, and the first spectrum is an unlicensed spectrum for the first network device.

With reference to the eighth aspect, in a first possible implementation manner, the determining, by the second network device, whether to allow the first network device to use the first spectrum includes:

determining, by the second network device according to an occupation factor of the second network device, whether to allow the first network device to use the first spectrum; or determining, by the second network device according to an occupation factor of the second network device and an occupation factor of the first network device, whether to allow the first network device to use the first spectrum, where an occupation factor of a network device is in inverse proportion to duration of occupying the first spectrum by the network device, and is in direct proportion to spectrum efficiency of using the first spectrum by the network device.

With reference to the first possible implementation manner of the eighth aspect, in a second possible implementation manner, the determining, by the second network device according to an occupation factor of the second network device and an occupation factor of the first network device, whether to allow the first network device to use the first spectrum includes:

when a difference between the occupation factor of the second network device and the occupation factor of the first network device is less than a preset occupation factor difference threshold, determining, by the second network device, to allow the first network device to use the first spectrum; or when a difference between the occupation factor of the second network device and the occupation factor of the first network device is not less than a preset occupation factor difference threshold, determining, by the second network device, not to allow the first network device to use the first spectrum.

With reference to the first possible implementation manner or the second possible implementation manner of the eighth aspect, in a third possible implementation manner, before the determining, by the second network device, whether to allow the first network device to use the first spectrum, the method further includes:

receiving, by the second network device, the occupation factor that is of the first network device and that is sent by the first network device.

With reference to the eighth aspect, in a fourth possible implementation manner, the terminal accesses the second network device after receiving control information that is sent by the first network device and that is used for instructing the terminal to access the second network device and query whether the second network device allows the first network device to use the first spectrum; and the feedback information includes first time information used for instructing the first network device to send the control information next time.

With reference to the eighth aspect, in a fifth possible implementation manner, the feedback information includes:

second time information used for indicating an available time of the first spectrum.

With reference to the fifth possible implementation manner of the eighth aspect, in a sixth possible implementation manner, the second time information includes:

a start moment T1 at which the first spectrum is available, available duration D1 for which the first spectrum is available starting from the start moment T1, and unavailable duration D2 for which the first spectrum is unavailable starting from an end moment of the available duration D1.

With reference to the eighth aspect, in a seventh possible implementation manner, the feedback information includes:

frequency information used for indicating an available frequency on the first spectrum.

With reference to the seventh possible implementation manner of the eighth aspect, in an eighth possible implementation manner, the frequency information includes:

a carrier identifier of an available carrier on the first spectrum; or a carrier bitmap, where the carrier bitmap is used for indicating whether each carrier on the first spectrum is available.

With reference to any one of the eighth aspect, or the first possible implementation manner to the eighth possible implementation manners of the eighth aspect, in a ninth possible implementation manner, that the second network device sends the feedback information includes:

sending, by the second network device, the feedback information by using an access response message.

According to a ninth aspect, an embodiment of the present invention provides a method for performing communication on an unlicensed spectrum, including:

sending, by a first network device, control information to a terminal, where the control information is used for instructing the terminal to access a second network device and instruct the second network device to stop using a first spectrum; and after sending the control information, using, by the first network device, the first spectrum to perform communication, where the first spectrum is an unlicensed spectrum for the first network device.

With reference to the ninth aspect, in a first possible implementation manner, the control information includes configuration information and activation information, the configuration information includes information about a physical resource and/or a physical signal used when the terminal accesses the second network device, and the activation information is used for instructing the terminal to access the second network device according to the configuration information; and that the first network device sends the control information to the terminal includes: sending, by the first network device, the configuration information to the terminal, and then sending the activation information to the terminal when the first network device needs to use the first spectrum to communicate with the terminal; or the control information includes the configuration information, and that the first network device sends the control information to the terminal includes: sending, by the first network device, the configuration information to the terminal when the first network device needs to use the first spectrum to communicate with the terminal.

With reference to the first possible implementation manner of the ninth aspect, in a second possible implementation manner, the physical signal includes:

an access preamble Preamble.

According to a tenth aspect, an embodiment of the present invention provides a method for performing communication on an unlicensed spectrum, including:

receiving, by a terminal, control information sent by a first network device, where the control information is used for instructing the terminal to access a second network device and instruct the second network device to stop using a first spectrum; and according to the control information, accessing, by the terminal, the second network device and instructing the second network device to stop using the first spectrum, where the first spectrum is an unlicensed spectrum for the first network device.

With reference to the tenth aspect, in a first possible implementation manner, the control information includes configuration information and activation information, the configuration information includes information about a physical resource and/or a physical signal used when the terminal accesses the second network device, and the activation information is used for instructing the terminal to access the second network device according to the configuration information; and that the terminal receives the control information, and accesses the second network device according to the control information includes: receiving and storing, by the terminal, the configuration information, and accessing the second network device according to the configuration information after receiving the activation information; or the control information includes the configuration information, and that the terminal receives the control information, and accesses the second network device according to the control information includes: receiving, by the terminal, the configuration information, and accessing the second network device according to the configuration information.

With reference to the first possible implementation manner of the tenth aspect, in a second possible implementation manner, the physical signal includes an access preamble Preamble.

In the embodiments of the present invention, when a first network device needs to use an unlicensed first spectrum, the first network device uses a terminal to query whether a second network device allows the first network device to use the first spectrum, and uses the first spectrum when the second network device allows the first network device to use the first spectrum; or when a first network device needs to use a first spectrum, the first network device uses a terminal to instruct a second network device to stop using the first spectrum. In this way, interference from the second network device on the first spectrum is effectively avoided.

DETAILED DESCRIPTION

Embodiments of the present invention provide a network device, a terminal, and a method for determining availability of a communication spectrum, so as to resolve the following problem: When a network device fails to effectively perceive another network device, but uses a communication spectrum of the another network device to communicate with a terminal, communication between the network device and the terminal may be interfered with by the another network device.

In an embodiment of the present invention, a first network device instructs a terminal to access a second network device and query whether the second network device allows the first network device to use a first spectrum. The first spectrum is an unlicensed spectrum for the first network device. The first network device determines a query result of the terminal, and determines, according to the query result, whether the first spectrum is available. The first network device uses the terminal to query whether the second network device allows the first network device to use the first spectrum, and determines, according to the query result, whether the first spectrum is available, thereby effectively avoiding potential interference from the second network device to communication between the first network device and the terminal.

In another embodiment of the present invention, a first network device instructs a terminal to access a second network device and instructs the second network device to stop using a first spectrum, and then the first network device uses the first spectrum to perform communication. The first spectrum is an unlicensed spectrum for the first network device. Because the second network device stops using the first spectrum, the first network device is not interfered with by the second network device when using the first spectrum to perform communication.

In the embodiments of the present invention, various network devices including a first network device and a second network device may include but are not limited to any one of the following devices: a base station (Base Station, BS), a NodeB (NodeB), an evolved NodeB (evolved NodeB, eNB), a base station controller (Base Station Controller, BSC), a radio network controller (Radio Network Controller, RNC), a Wi-Fi AP, or a Wi-Fi access controller (Access Controller, AC).

Figure 1:
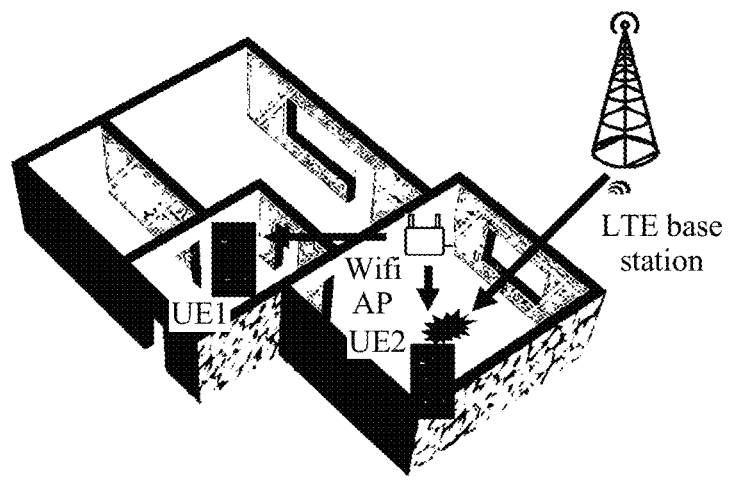
FIG. 1 is a schematic diagram of an HTP problem.
Figure 2:
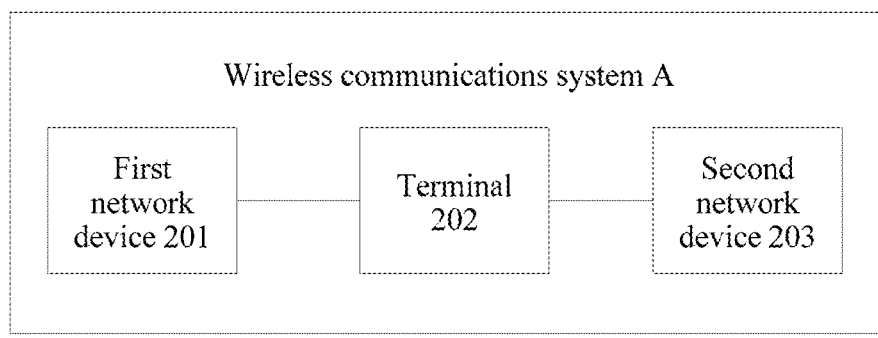
FIG. 2 is a schematic structural diagram of a wireless communications system A according to Embodiment 1 of the present invention.
Figure 3:
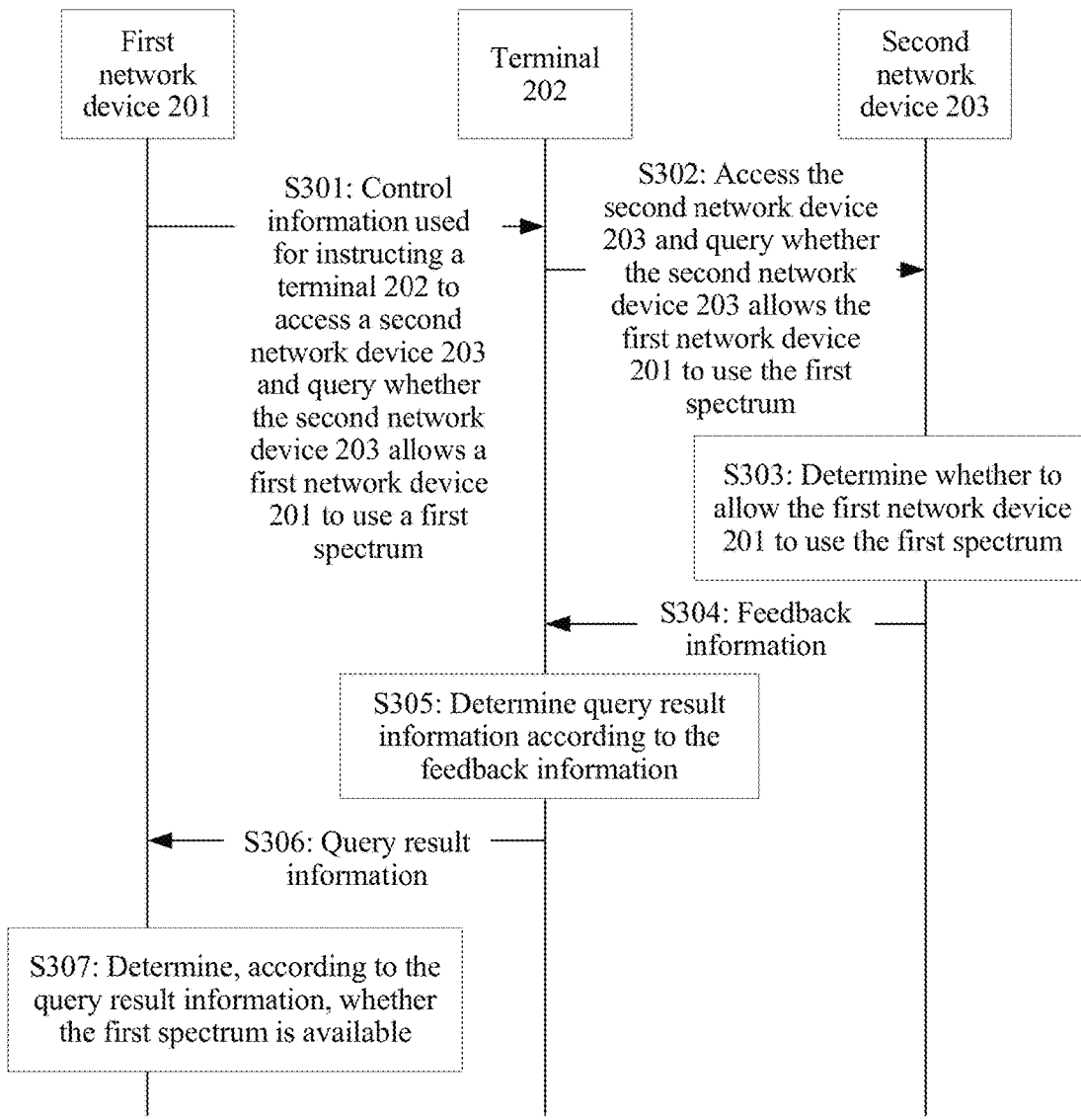
FIG. 3 is a diagram of message exchange between devices in the wireless communications system A provided in Embodiment 1 of the present invention.
Figure 4:
FIG. 4 is a schematic structural diagram of a first type of first network device according to Embodiment 2 of the present invention.
Figure 5:
FIG. 5 is a schematic structural diagram of a second type of first network device according to Embodiment 3 of the present invention.
Figure 6:
FIG. 6 is a schematic structural diagram of a first type of terminal according to Embodiment 4 of the present invention.
Figure 7:
FIG. 7 is a schematic structural diagram of a second type of terminal according to Embodiment 5 of the present invention.
Figure 8:
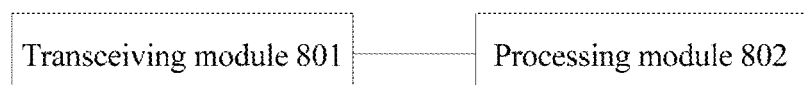
FIG. 8 is a schematic structural diagram of a first type of second network device according to Embodiment 6 of the present invention.
Figure 9:
FIG. 9 is a schematic structural diagram of a second type of second network device according to Embodiment 7 of the present invention.
Figure 10:
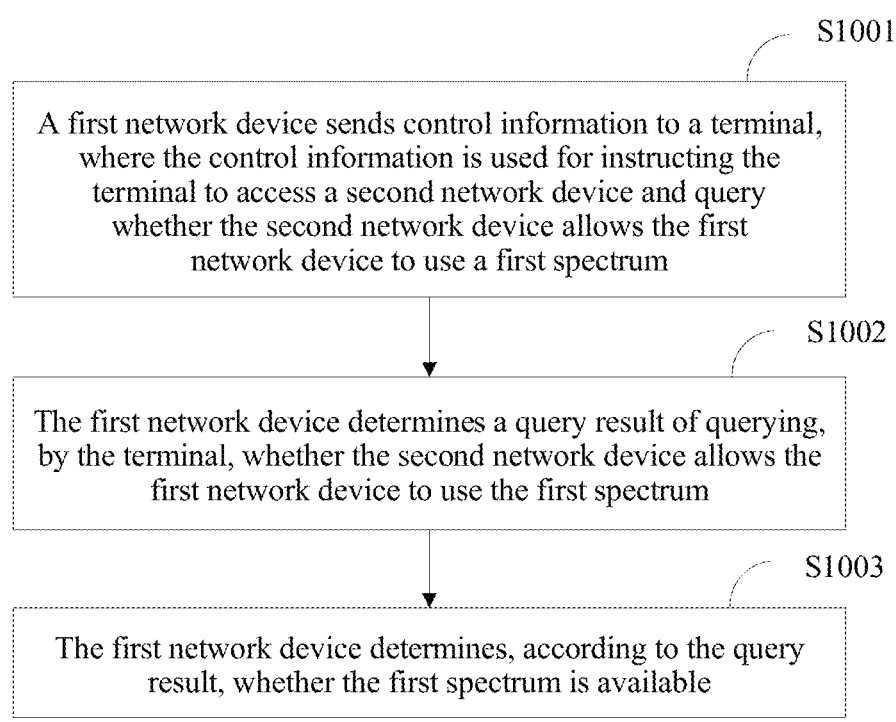
FIG. 10 is a flowchart of a first method for determining availability of a communication spectrum according to Embodiment 8 of the present invention.
Figure 11:
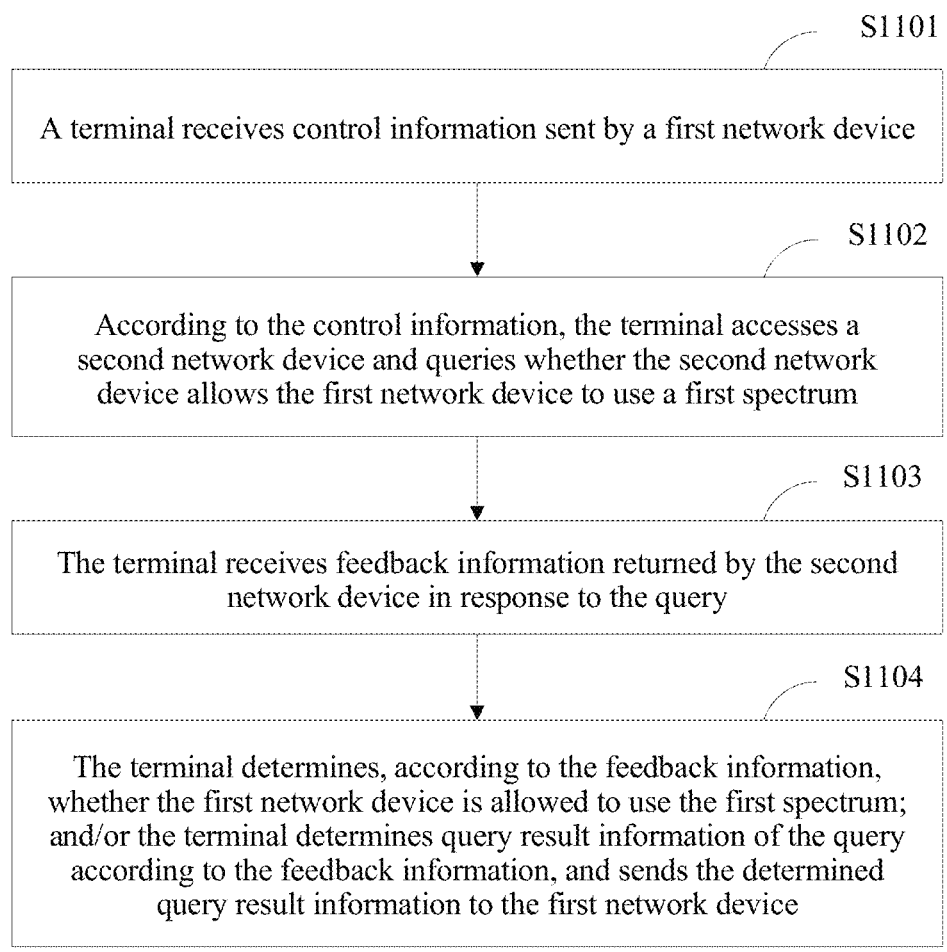
FIG. 11 is a flowchart of a second method for determining availability of a communication spectrum according to Embodiment 9 of the present invention.
Figure 12:
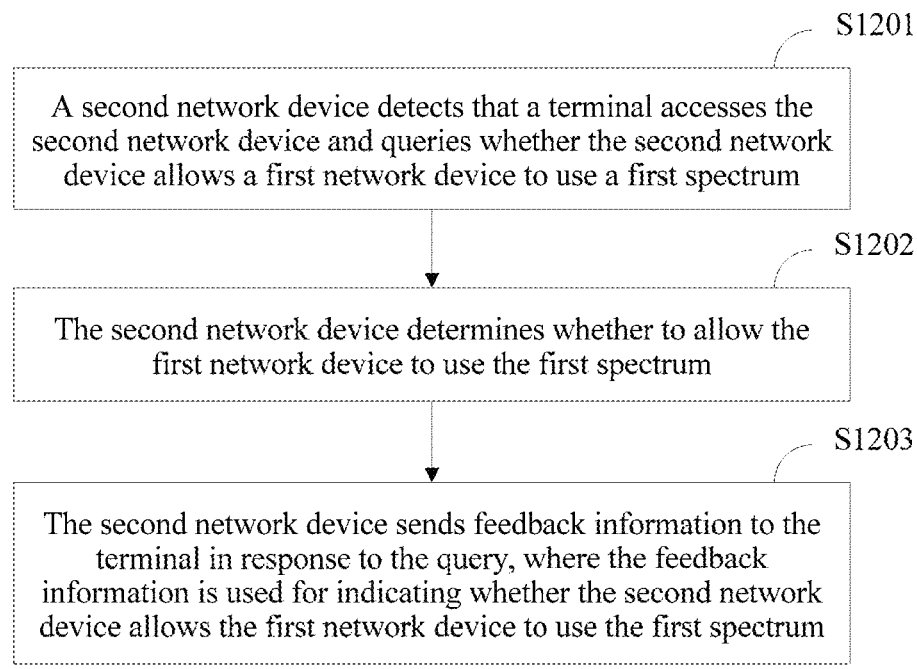
FIG. 12 is a flowchart of a third method for determining availability of a communication spectrum according to Embodiment 10 of the present invention.
Figure 13:
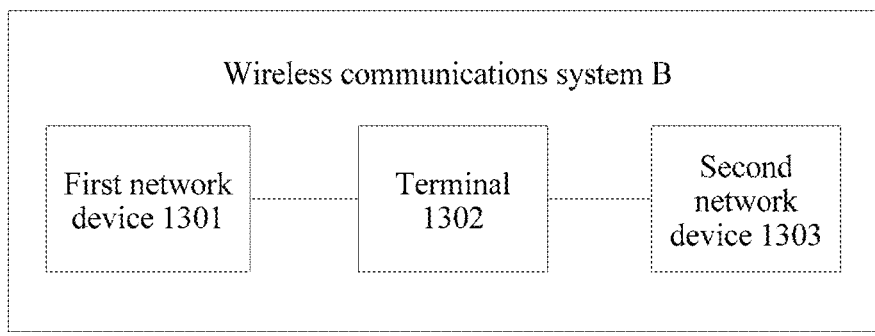
FIG. 13 is a schematic structural diagram of a wireless communications system B according to Embodiment 11 of the present invention.
Figure 14:
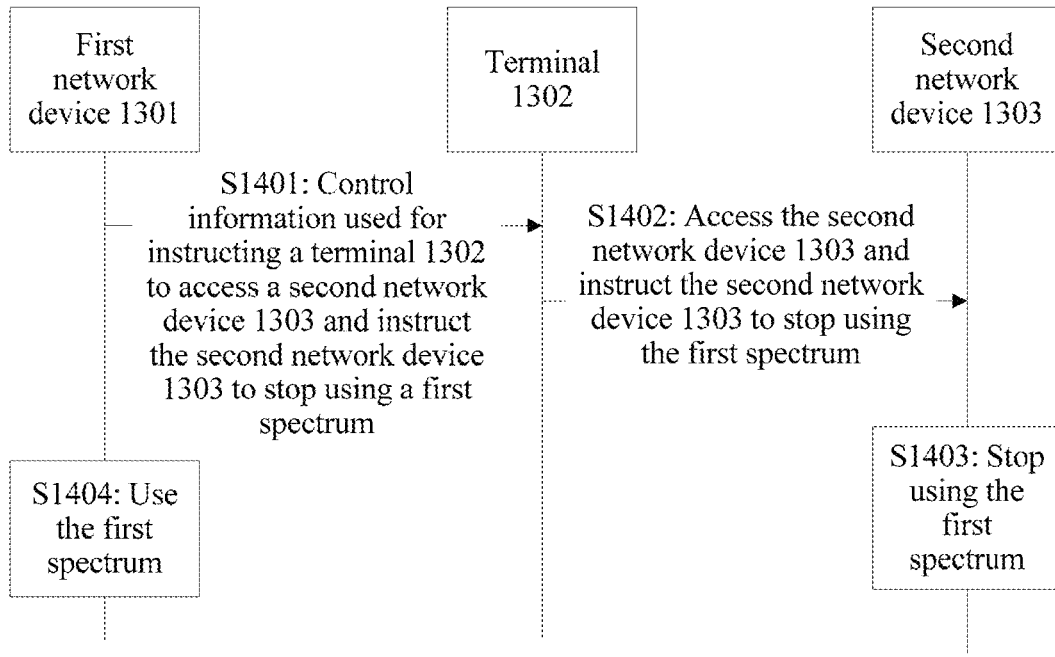
FIG. 14 is a diagram of message exchange between devices in the wireless communications system B provided in Embodiment 11 of the present invention.
Figure 15:
FIG. 15 is a schematic structural diagram of a third type of first network device according to Embodiment 12 of the present invention.
Figure 16:
FIG. 16 is a schematic structural diagram of a fourth type of first network device according to Embodiment 13 of the present invention.
Figure 17:
FIG. 17 is a schematic structural diagram of a third type of terminal according to Embodiment 14 of the present invention.
Figure 18:
FIG. 18 is a schematic structural diagram of a fourth type of terminal according to Embodiment 15 of the present invention.
Figure 19:
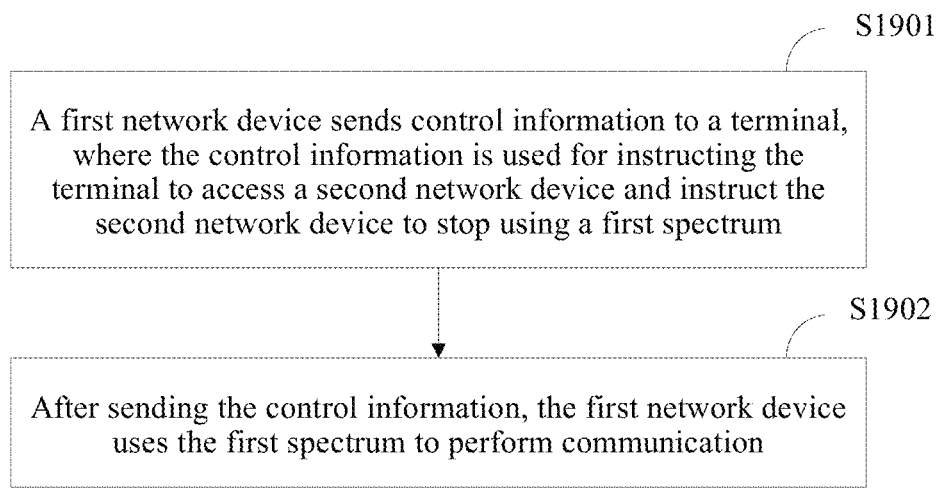
FIG. 19 is a flowchart of a first method for performing communication on an unlicensed spectrum according to Embodiment 16 of the present invention.
Figure 20:
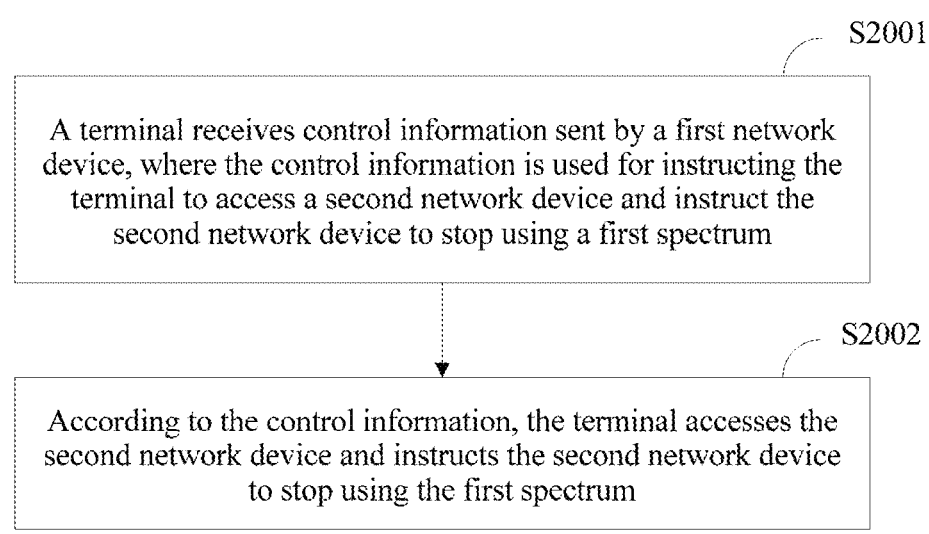
FIG. 20 is a flowchart of a second method for performing communication on an unlicensed spectrum according to Embodiment 17 of the present invention.

First, the embodiments of the present invention are briefly described by using the following table:

| Embodiments | Embodiment content | Corresponding accompanying drawings |
| --- | --- | --- |
| Embodiment 1 | Wireless communications system A | FIG. 2 and FIG. 3 |
| Embodiment 2 | Applicable to a first type of first network device in a wireless communications system A | FIG. 4 |
| Embodiment 3 | Applicable to a second type of first network device in a wireless communications system A | FIG. 5 |
| Embodiment 4 | Applicable to a first type of terminal in a wireless communications system A | FIG. 6 |
| Embodiment 5 | Applicable to a second type of terminal in a wireless communications system A | FIG. 7 |
| Embodiment 6 | Applicable to a first type of second network device in a wireless communications system A | FIG. 8 |
| Embodiment 7 | Applicable to a second type of second network device in a wireless communications system A | FIG. 9 |
| Embodiment 8 | Applicable to a first method for determining availability of a communication spectrum in a wireless communications system A | FIG. 10 |
| Embodiment 9 | Applicable to a second method for determining availability of a communication spectrum in a wireless communications system A | FIG. 11 |
| Embodiment 10 | Applicable to a third method for determining availability of a communication spectrum in a wireless communications system A | FIG. 12 |
| Embodiment 11 | Wireless communications system B | FIG. 13 and FIG. 14 |
| Embodiment 12 | Applicable to a third type of first network device in a wireless communications system B | FIG. 15 |
| Embodiment 13 | Applicable to a fourth type of first network device in a wireless communications system B | FIG. 16 |
| Embodiment 14 | Applicable to a third type of terminal in a wireless communications system B | FIG. 17 |
| Embodiment 15 | Applicable to a fourth type of terminal in a wireless communications system B | FIG. 18 |
| Embodiment 16 | Applicable to a first method for performing communication on an unlicensed spectrum in a wireless communications system B | FIG. 19 |
| Embodiment 17 | Applicable to a second method for performing communication on an unlicensed spectrum in a wireless communications system B | FIG. 20 |

With reference to accompanying drawings, the following describes in detail the embodiments of the present invention.

Embodiment 1

Embodiment 1 provides a wireless communications system A.

As shown in FIG. 2, the wireless communications system A includes a first network device 201, a terminal 202, and a second network device 203.

The first network device 201 is configured to: send control information to the terminal 202, where the control information is used for instructing the terminal 202 to access the second network device 203 and query whether the second network device 203 allows the first network device 201 to use a first spectrum; determine a query result of querying, by the terminal 202, whether the second network device 203 allows the first network device 201 to use the first spectrum; and determine, according to the query result, whether the first spectrum is available.

The terminal 202 is configured to: receive the control information sent by the first network device 201; according to the control information, access the second network device 203 and query whether the second network device 203 allows the first network device 201 to use the first spectrum; receive feedback information returned by the second network device 203 in response to the query; determine, according to the feedback information, whether the first network device 201 is allowed to use the first spectrum; and/or determine query result information of the query according to the feedback information, and send the determined query result information to the first network device 201.

The second network device 203 is configured to: detect that the terminal 202 accesses the second network device 203 and queries whether the second network device 203 allows the first network device 201 to use the first spectrum; determine whether to allow the first network device 201 to use the first spectrum; and send the feedback information to the terminal 202 in response to the query, where the feedback information is used for indicating whether the second network device 203 allows the first network device to use the first spectrum.

The first spectrum is an unlicensed spectrum for the first network device 201. The terminal 202 is a terminal served by the first network device 201.

When the first network device 201 needs to use the first spectrum, the first network device 201 may first scan a signal on the first spectrum, and if strength or energy of the scanned signal is less than a preset threshold, send the foregoing control information to the terminal 202 within a coverage area of the first network device 201, to instruct the terminal 202 to access the second network device and query whether the second network device 203 allows the first network device 201 to use the first spectrum.

Herein, the first network device 201 may determine the terminal 202 from all terminals within the coverage area of the first network device 201 according to received strength or energy, fed back by all the terminals, of signals that are received by all the terminals from the network device 201 and the second network device 203. For example, the terminal 202 is selected from all the terminals, where a difference between strength of a signal received by the terminal 202 from the first network device 201 and strength of a signal received by the terminal 202 from the second network device 203 on the first spectrum falls within a specific range, and it is determined, according to a received difference between strength, fed back by the terminal 202, of a signal received by the terminal 202 from the network device 201 and strength, fed back by the terminal 202, of a signal received by the terminal 202 from another network device, that the terminal 202 is located on the edge of the coverage area of the network device 201, but can still correctly receive the control information sent by the network device 201.

Alternatively, the network device 201 broadcasts the control information, or sends the control information to multiple terminals 202 within the coverage area of the network device 201, to instruct a terminal that receives the control information to access the second network device 203 and query whether the second network device 203 allows the first network device 201 to use the first spectrum.

Alternatively, if the network device 201 needs to use the first spectrum to communicate with the terminal 202, the network device 201 sends the foregoing control information to the terminal 202 to be communicated with, to instruct the terminal 202 to access the second network device 203 and query whether the second network device 203 allows the first network device 201 to use the first spectrum.

The terminal 202 feeds back the query result to the first network device 201 in two manners:

feedback manner 1: an explicit feedback manner; and
feedback manner 2: an implicit feedback manner.

In the explicit feedback manner, the terminal 202 determines the query result information according to the received feedback information sent by the second network device 203, and sends the query result information to the first network device 201, and the first network device 201 determines the query result according to the received query result information, and determines, according to the query result, whether the first spectrum is available.

In the implicit feedback manner, the terminal 202 first determines, according to the feedback information sent by the second network device 203, whether the first network device is allowed to use the first spectrum; and if the terminal 202 determines that the first network device is allowed to use the first spectrum, as for whether the first network device 201 is allowed to use the first spectrum, the terminal 202 remains silent to the first network device 201 and does not send information to the first network device 201 within first duration after receiving the foregoing control information sent by the first network device 201; or if the terminal 202 determines that the first network device 201 is not allowed to use the first spectrum, the terminal 202 determines the query result information of the query according to the feedback information sent by the second network device 203, and sends the query result information to the first network device 201 within first duration after receiving the foregoing control information sent by the first network device 201.

Optionally, when sending the foregoing control information, the first network device 201 may send timing information. The timing information is used for indicating, to the terminal 202, a moment at which the first network device 201 sends the control information. In this case, the terminal 202 may determine, according to the timing information, the moment at which the first network device 201 sends the control information, so that when it is determined that the first network device is allowed to use the first spectrum, the terminal 202 remains silent to the first network device 201 within the first duration following the moment at which the first network device 201 sends the control information; or when it is determined that the first network device is not allowed to use the first spectrum, the terminal 202 sends the query result information to the first network device 201 within the first duration following the moment at which the first network device 201 sends the control information.

After sending the control information, the first network device 201 waits to receive the query result information returned by the terminal 202, and if the first network device 201 does not receive, within the first duration after sending the control information, the query result information returned by the terminal 202, the first network device 201 determines that the query result is that the first spectrum is available to the first network device 201; or if the first network device 201 receives, within the first duration after sending the control information, the query result information returned by the terminal, and the query result information indicates that the first network device 201 is not allowed to use the first spectrum, the first network device 201 determines that the query result is that the first spectrum is unavailable to the first network device 201.

The terminal 202 may use the feedback information sent by the second network device 203 as the query result information.

With reference to a diagram of message exchange in FIG. 3, the following describes message exchange between the devices in the wireless communications system A by using the explicit feedback manner as an example. In FIG. 3, the following steps are included:

S301: The first network device 201 sends control information to the terminal 202, to instruct the terminal 202 to access the second network device 203 and query whether the second network device 203 allows the first network device 201 to use a first spectrum.

S302: The terminal 202 accesses the second network device 201, and queries whether the second network device 203 allows the first network device 201 to use the first spectrum.

S303: The second network device 203 determines whether to allow the first network device 201 to use the first spectrum.

S304: The second network device 203 sends feedback information to the terminal 202.

S305: The terminal 202 determines query result infatuation according to the feedback information.

S306: The terminal 202 sends the query result information to the first network device 201.

S307: The first network device 201 determines, according to the query result information, whether the first spectrum is available.

A manner in which the terminal 202 feeds back the query result to the first network device 201 is described above, and the following describes in detail an optional solution for sending the control information by the first network device 201.

Optionally, the control information has two forms:

Form 1 of the control information: The control information includes configuration information and activation information.

Form 2 of the control information: The control information includes configuration information.

In the foregoing two forms of the control information, the configuration information includes information about a physical resource and/or a physical signal used when the terminal 202 accesses the second network device 203.

In Form 1 of the control information, the activation information is used for instructing the terminal 202 to access the second network device 203 according to the foregoing configuration information, and the first network device 201 sends the activation information to the terminal 202 when the first network device 201 needs to use the first spectrum to communicate with the terminal 202.

In Form 2 of the control information, the first network device 201 sends the foregoing configuration information to the terminal 202 when the first network device 201 needs to use the first spectrum to communicate with the terminal 202.

Optionally, the information about the physical resource in the configuration information may include related information, such as a frequency, a timeslot, and/or a symbol, of a physical channel used when the terminal 202 accesses the second network device 203.

Optionally, the physical signal mentioned in the information about the physical signal in the configuration information may be an access preamble (Preamble), and preamble information may be a preamble number.

Optionally, the information about the foregoing physical signal may be pre-agreed between the first network device 201 and the second network device 203, or is preconfigured in an operation and maintenance (Operation & Maintenance, OAM) manner and is notified to the first network device 201 and the second network device 203.

Optionally, when the second network device 203 receives a preamble sent by the terminal 202, if the second network device 203 determines that the preamble is preconfigured or pre-agreed and is used by the first network device 202 to query whether the second network device 203 allows the first network device 201 to use a specific preamble of the first spectrum, the second network device 203 determines whether to allow the first network device 201 to use the first spectrum. Optionally, the feedback information may be sent to the terminal 202 by using an access response message such as a random access channel (Random Access CHannel, RACH) response, and the feedback information is used for indicating whether the second network device 203 allows the first network device 201 to use the first spectrum.

Optionally, the configuration information further includes query result feedback manner information used for indicating whether a manner of feeding back the query result by the terminal 202 is an explicit feedback manner or an implicit feedback manner.

Optionally, the configuration information may further include a network device identifier that is of the second network device 203 and that is used for instructing the terminal 202 to access a network device identified by the network device identifier.

Optionally, if the configuration information does not include a network device identifier of the second network device 203, the terminal 202 still attempts to access a surrounding second network device 203, but instead of accessing a specific second network device 203, sends the access preamble Preamble in a broadcast manner. If a second network device 203 or some second network devices 203 around the terminal 202 receive the preamble, it is determined whether the received preamble is a specific preconfigured or pre-agreed preamble. If the preamble is used specially for instructing the first network device 201 to determine whether the second network device 203 allows the first network device 201 to use the first spectrum, the second network device 203 determines whether to allow the first network device 201 to use the first spectrum, and sends the feedback information to the terminal 202. The feedback information is used for indicating whether the first network device 201 is allowed to use the first spectrum.

Optionally, the configuration information may further include first spectrum information used for indicating the first spectrum, and the first spectrum information indicates, to the terminal 202, the first spectrum that needs to be queried by the terminal 202. Optionally, when querying the second network device 203, the terminal 202 sends the first spectrum information to the second network device 203, and then the second network device 203 determines, according to the first spectrum information, the first spectrum that needs to be determined.

Optionally, if the configuration information does not include first spectrum information, the terminal 202 and the second network device 203 may use a preconfigured or pre-agreed spectrum as the first spectrum that needs to be determined.

Optionally, the configuration information may further include query result resource indication information. The query result resource indication information is used for indicating a spectrum resource used when the terminal 202 reports the query result information. The frequency resource may be located on a second spectrum being used by the first network device 201, or may be located on the first spectrum. If the spectrum resource is located on the first spectrum, it is required to ensure that this part of spectrum resource is reserved, thereby avoiding interference from the second network device 203 to the first network device 201.

In Form 1 of the control information, the first network device 201 may first send the configuration information to the terminal 202. For example, the first network device 201 may send the configuration information to all terminals within the coverage area of the first network device 201 by using a system message such as a system information block 2 (System Information Block 2, SIB2), or may send the configuration information to the terminal 201 by using dedicated signaling such as radio resource control (Radio Resource Control, RRC) signaling. Then, when the terminal 202 needs to query whether the second network device 203 allows the first network device 201 to use the first spectrum, for example, when the first network device 201 needs to use the first spectrum to communicate with the terminal 202, the first network device 201 sends the activation information to the terminal 202, to activate the terminal 202 to query the second network device 203. The activation information may be sent by using dedicated signaling such as RRC signaling or by using a physical downlink control channel (Physical Downlink Control Channel, PDCCH).

Correspondingly, after receiving the configuration information, the terminal 202 may store the configuration information. After receiving the activation information, according to the prestored configuration information, the terminal 202 accesses the second network device and queries whether the second network device 203 allows the first network device 201 to use the first spectrum.

In Form 2 of the control information, when the terminal 202 needs to query whether the second network device 203 allows the first network device 201 to use the first spectrum, for example, when the first network device 201 needs to use the first spectrum to communicate with the terminal 202, the first network device 201 sends the foregoing configuration information to the terminal 202. After receiving the configuration information, according to the configuration information, the terminal 202 accesses the second network device 203 and queries whether the second network device 203 allows the first network device 201 to use the first spectrum.

Optionally, the first network device 201 sends the control information to the tell final 202, and identifies the control information by using a first identifier of the terminal 202. The first identifier is used for indicating the terminal 202, and the control information is sent to the terminal 202 and is used for instructing the terminal 202 to determine whether the first spectrum is available to the first network device.

In Form 1 of the control information, optionally, if the first network device 201 sends the activation information on a physical downlink control channel (Physical Downlink Control CHannel, PDCCH), the first network device 201 may scramble cyclic redundancy check (Cyclic Redundancy Check, CRC) information in the activation information by using the foregoing first identifier of the terminal 202, to identify the control information by using the first identifier of the terminal 202.

Correspondingly, the terminal 202 may receive the activation information on the PDCCH, descramble the CRC in the activation information by using the first identifier of the terminal 202, and if the descrambling succeeds, determine that the activation information is identified by the first identifier of the terminal 202.

Optionally, the first identifier may be named as a hidden node-detection-radio network temporary identifier (HTP-detection-Radio Network Temporary Identity, HTP-detection-RNTI).

In Form 2 of the control information, if the configuration information is sent by using a PDCCH, CRC information in the configuration information may be scrambled by using the first identifier of the terminal 202, to identify the configuration information. Correspondingly, the terminal 202 receives the configuration information on the PDCCH, descrambles the CRC in the configuration information by using the first identifier of the terminal 202, and if the descrambling succeeds, determines that the configuration information is identified by the first identifier of the terminal 202.

Optionally, to prevent the terminal 202 from frequently receiving the control information, and prevent large power consumption and heavy processing load on the terminal, the terminal may receive the control information only when a preset condition is met.

For example, in Form 1 of the control information, before sending the activation information, the first network device 201 may send a first receive threshold to the terminal 202 in a broadcast manner or by using dedicated signaling. The first receive threshold is used for instructing the terminal 202 to receive the activation information when the following condition is met:

a difference between strength of a received signal that is transmitted by the first network device 201 and strength of a signal that is transmitted by the second network device 203 and that is received on the first spectrum is less than the first receive threshold.

In Form 2 of the control information, before sending the configuration information, the first network device 201 may send a second receive threshold to the terminal 202 in a broadcast manner or by using dedicated signaling. The terminal 202 receives the configuration information when the following condition is met:

a difference between strength of a received signal that is transmitted by the first network device 201 and strength of a signal that is transmitted by the second network device 203 and that is received on the first spectrum is less than the second receive threshold.

Sending and receiving of the control information are described in detail above. The following describes how the second network device 203 determines whether to allow the first network device 201 to use the first spectrum and sends the feedback information, how the terminal 202 sends the query result information, and how the first network device 201 determines, according to the query result information, whether the first spectrum is available.

Optionally, the first network device 201 and the second network device 203 pre-agree on the information about the physical signal used when the ten final 202 accesses the second network device 203, or preconfigure the information about the physical signal in an OAM manner and notify the information to the first network device 201 and the second network device 203 in advance. Therefore, when the second network device 203 detects that the terminal 202 accesses the second network device 203, if the second network device 203 determines that the physical signal used during access of the terminal 202 is a physical signal indicated by the foregoing pre-agreed information about the physical signal, the second network device 203 determines a purpose for which the terminal 202 accesses the second network device 203 is to query whether the second network device 203 allows the first network device 201 to use the first spectrum.

Optionally, the first network device 201 may send an occupation factor of the first network device 201 to the second network device after or before sending the control information to the terminal 202; or after the second network device 203 detects that the terminal 202 accesses the second network device 203 and queries whether the first network device 201 is allowed to use the first spectrum, when determining whether to allow the first network device 201 to use the first spectrum, the second network device 203 sends, to the first network device 201, a message for querying an occupation factor of the first network device 201, and after receiving the message, the first network device 201 sends the occupation factor of the first network device 201 to the second network device 203.

The second network device 203 compares the received occupation factor of the first network device 201 with an occupation factor of the second network device 203, to determine whether to allow the first network device 201 to use the first spectrum.

An occupation factor of a network device is in inverse proportion to duration of occupying the first spectrum by the network device, and is in direct proportion to spectrum efficiency of using the first spectrum by the network device.

Optionally, when a difference between the occupation factor of the second network device 203 and the occupation factor of the first network device 201 is less than a preset occupation factor difference threshold, the second network device 203 determines to allow the first network device 201 to use the first spectrum; or if a difference between the occupation factor of the second network device 203 and the occupation factor of the first network device 201 is not less than a preset occupation factor difference threshold, the second network device 203 determines not to allow the first network device 201 to use the first spectrum.

For example, the preset occupation factor difference threshold is 0. When the occupation factor of the second network device 203 is less than the occupation factor of the first network device 201, the second network device 203 determines to allow the first network device 201 to use the first spectrum; or when the occupation factor of the second network device 203 is not less than the occupation factor of the first network device 201, the second network device 203 determines not to allow the first network device 201 to use the first spectrum.

For another example, the preset occupation factor difference threshold is a negative value such as −d, and d>0. When the occupation factor of the first network device 201 is greater than the occupation factor of the second network device 203, and the difference is greater than d, the second network device 203 determines to allow the first network device 201 to use the first spectrum; or when the difference is not greater than d, the second network device 203 determines not to allow the first network device 201 to use the first spectrum.

Optionally, the second network device 203 may determine, according to an occupation factor of the second network device 203, whether to allow the first network device 201 to use the first spectrum. For example, when the occupation factor of the second network device 203 is less than a preset occupation factor threshold, the second network device 203 determines to allow the first network device 201 to use the first spectrum; or when the occupation factor of second network device 203 is not less than a preset occupation factor threshold, the second network device 203 determines not to allow the first network device 201 to use the first spectrum.

After determining whether to allow the first network device 201 to use the first spectrum, the second network device 203 sends the feedback information to the first network device 201. The feedback information includes but is not limited to one or more items of the following information:

indication information used for indicating whether the first network device 201 is allowed to use the first spectrum;

first time information used for instructing the first network device 201 to send the control information next time if the second network device 203 determines not to allow the first network device 201 to use the first spectrum, where for example, the first time information is used for instructing the first network device 201 to send the foregoing control information to the terminal 202 only after a period of time and instructing the terminal 202 to access the second network device 203 and query whether the second network device 203 allows the first network device 201 to use the first spectrum; and the first time information may be determined by the second network device 203 according to one or more factors of a channel-specific status of a channel on the first spectrum occupied by the second network device 203, an estimated amount of remaining data of the first spectrum used by the second network device 203, or a time for transmitting the amount of remaining data;

second time information used for indicating an available time of the first spectrum, such as a start moment T1 at which the first spectrum is available, available duration D1 for which the first spectrum is available starting from the start moment T1, and unavailable duration D2 for which the first spectrum is unavailable starting from an end moment of the available duration D1; or frequency information used for indicating an available frequency on the first spectrum, such as a carrier identifier of an available carrier on the first spectrum, or a carrier bitmap, where the carrier bitmap is used for indicating whether each carrier on the first spectrum is available.

The wireless communications system A provided in Embodiment 1 of the present invention is described above. In the wireless communications system A, the first network device 201 uses the terminal 202 to query whether the second network device 203 allows the second network device 203 to use the first spectrum, and uses the first spectrum when the second network device 203 allows the first network device 201 to use the first spectrum, thereby effectively avoiding interference from the second network device 203 caused when the first spectrum is used for communication.

Based on a same invention concept, Embodiment 2 to Embodiment 10 of the present invention separately provide a first network device, a second network device, a terminal, and a method for determining availability of a communication spectrum that are applicable to the wireless communications system A. Principles of these network devices, the terminal, and the method for resolving technical problems are similar to those in the wireless communications system A. For implementation thereof, refer to implementation of the wireless communications system A. Details are not repeatedly described herein.

Embodiment 2

FIG. 4 is a schematic structural diagram of a first type of first network device according to Embodiment 2 of the present invention. As shown in FIG. 4, the first network device includes:

a transceiving module 401, configured to send control information to a terminal, where the control information is used for instructing the terminal to access a second network device and query whether the second network device allows the first network device to use a first spectrum; and a processing module 402, configured to: determine a query result of querying, by the terminal, whether the second network device allows the first network device to use the first spectrum, and determine, according to the query result, whether the first spectrum is available.

The first spectrum is an unlicensed spectrum for the first network device.

Optionally, the control information includes configuration information and activation information, the configuration information includes information about a physical resource and/or a physical signal used when the terminal accesses the second network device, and the activation information is used for instructing the terminal to access the second network device according to the configuration information; and the transceiving module 401 is specifically configured to: send the configuration information to the terminal, and then send the activation information to the terminal when the first network device needs to use the first spectrum to communicate with the terminal; or the control information includes configuration information, and the transceiving module 401 is specifically configured to send the configuration information to the terminal when the first network device needs to use the first spectrum to communicate with the terminal.

Optionally, the physical signal includes an access preamble Preamble.

Optionally, the information about the physical signal is pre-agreed between the first network device and the second network device, or is preconfigured in an operation and maintenance OAM manner and is notified to the first network device and the second network device.

Optionally, the configuration information further includes:

query result feedback manner information used for indicating whether a manner of feeding back the query result by the terminal is an explicit feedback manner or an implicit feedback manner.

Optionally, if the query result feedback manner information indicates that the manner of feeding back the query result by the terminal is an explicit feedback manner, the transceiving module 401 is further configured to receive query result information returned by the terminal; and the processing module 402 is specifically configured to determine the query result according to the query result information.

Optionally, if the query result feedback manner information indicates that the manner of feeding back the query result by the terminal is an implicit feedback manner, the transceiving module 401 is further configured to receive query result information returned by the terminal; and the processing module 402 is specifically configured to:

if the transceiving module 401 does not receive, within first duration after sending the control information, the query result information returned by the terminal, determine that the query result is that the first spectrum is available to the first network device; or if the transceiving module 401 receives, within first duration after sending the control information, the query result information returned by the terminal, and the query result information indicates that the first network device is not allowed to use the first spectrum, determine that the query result is that the first spectrum is unavailable to the first network device.

Optionally, if the processing module 402 determines that the first spectrum is unavailable, the query result information includes:

first time information used for instructing the first network device to send the control information next time.

Optionally, the query result information includes:

second time information used for indicating an available time of the first spectrum.

Optionally, the second time information includes:

a start moment T1 at which the first spectrum is available, available duration D1 for which the first spectrum is available starting from the start moment T1, and unavailable duration D2 for which the first spectrum is unavailable starting from an end moment of the available duration D1.

The processing module 402 is specifically configured to determine that the first spectrum is available within the duration D1 starting from the start moment T1 and that the first spectrum is unavailable within the duration D2 following the duration D1, where D1+D2 is a cycle.

Optionally, the query result information includes:

frequency information used for indicating an available frequency on the first spectrum.

Optionally, the frequency information includes:

a carrier identifier of an available carrier on the first spectrum; or a carrier bitmap, where the carrier bitmap is used for indicating whether each carrier on the first spectrum is available.

Optionally, if the control information includes the configuration information and the activation information, before sending the activation information, the transceiving module 401 is further configured to:

send a first receive threshold to the terminal, where the first receive threshold is used for instructing the terminal to receive the activation information when the following condition is met:

a difference between strength of a received signal that is transmitted by the first network device and strength of a signal that is transmitted by the second network device and that is received on the first spectrum is less than the first receive threshold.

Optionally, if the control information includes the configuration information, before sending the configuration information, the transceiving module 401 is further configured to:

send a second receive threshold to the terminal, where the second receive threshold is used for instructing the terminal to receive the configuration information when the following condition is met:

a difference between strength of a received signal that is transmitted by the first network device and strength of a signal that is transmitted by the second network device and that is received on the first spectrum is less than the second receive threshold.

Optionally, the transceiving module 401 is specifically:

send the control information to the terminal, and identify the control information by using a first identifier of the terminal.

The first identifier is used for indicating the terminal, and the control information is sent to the terminal and is used for instructing the terminal to access the second network device and query whether the second network device allows the first network device to use the first spectrum.

Optionally, if the control information includes the configuration information and the activation information, the transceiving module 401 is specifically configured to: send the activation information on a physical downlink control channel, and scramble cyclic redundancy check CRC information in the activation information by using the first identifier of the terminal.

Optionally, if the control information includes the configuration information, the transceiving module 401 is specifically configured to: send the configuration information on a physical downlink control channel, and scramble CRC information in the configuration information by using the first identifier of the terminal.

Optionally, the configuration information further includes a network device identifier that is of the second network device and that is used for instructing the terminal to access a network device identified by the network device identifier.

Optionally, the transceiving module 401 is further configured to:

send an occupation factor of the first network device to the second network device, and instruct the second network device to determine, according to an occupation factor of the second network device and the occupation factor of the first network device, whether to allow the first network device to use the first spectrum.

An occupation factor of a network device is in inverse proportion to duration of occupying the first spectrum by the network device, and is in direct proportion to spectrum efficiency of using the first spectrum by the network device.

Embodiment 3

FIG. 5 is a schematic structural diagram of a second type of first network device according to Embodiment 3 of the present invention. As shown in FIG. 5, the first network device includes:

a transceiver 501, configured to send control information to a terminal, where the control information is used for instructing the terminal to access a second network device and query whether the second network device allows the first network device to use a first spectrum; and a processor 502, configured to: determine a query result of querying, by the terminal, whether the second network device allows the first network device to use the first spectrum, and determine, according to the query result, whether the first spectrum is available.

The first spectrum is an unlicensed spectrum for the first network device.

Embodiment 4

FIG. 6 is a schematic structural diagram of a first type of terminal according to Embodiment 4 of the present invention. As shown in FIG. 6, the terminal includes:

a transceiving module 601, configured to receive control information sent by a first network device; and a processing module 602, configured to: according to the control information, access a second network device and query whether the second network device allows the first network device to use a first spectrum.

The transceiving module 601 is further configured to receive feedback information returned by the second network device in response to the query.

The processing module 602 is further configured to determine, according to the feedback information, whether the first network device is allowed to use the first spectrum; and/or the processing module 602 is further configured to determine query result information of the query according to the feedback information, and the transceiving module 601 is further configured to send the query result information determined by the processing module 602 to the first network device.

The first spectrum is an unlicensed spectrum for the first network device.

Optionally, the control information includes configuration information and activation information, the configuration information includes information about a physical resource and/or a physical signal used when the terminal accesses the second network device, and the activation information is used for instructing the terminal to access the second network device according to the configuration information; the transceiving module 601 is specifically configured to receive and store the configuration information; and the processing module 602 is specifically configured to access the second network device according to the configuration information after the transceiving module 601 receives the activation information; or the control information includes configuration information, and the processing module 602 is specifically configured to access the second network device according to the configuration information received by the transceiving module 601.

Optionally, the physical signal includes an access preamble Preamble.

Optionally, the information about the physical signal is pre-agreed between the first network device and the second network device, or is preconfigured in an operation and maintenance OAM manner and is notified to the first network device and the second network device.

Optionally, the configuration information further includes:

query result feedback manner information used for indicating whether a manner of feeding back a query result by the terminal is an explicit feedback manner or an implicit feedback manner.

Optionally, if the query result feedback manner information indicates that the manner of feeding back the query result by the terminal is an explicit feedback manner, the processing module 602 determines the query result information of the query according to the feedback information, and the transceiving module 601 sends the query result information determined by the processing module 602 to the first network device.

Optionally, if the query result feedback manner information indicates that the manner of feeding back the query result by the terminal is an implicit feedback manner, the processing module 602 is configured to determine, according to the feedback information, whether the first network device is allowed to use the first spectrum; and if the processing module 602 determines that the first network device is allowed to use the first spectrum, as for whether the first network device is allowed to use the first spectrum, the transceiving module 601 remains silent to the first network device and does not send information to the first network device within first duration after the first network device sends the control information; or if the processing module 602 determines that the first network device is not allowed to use the first spectrum, the processing module 602 determines the query result information of the query according to the feedback information, and the transceiving module 601 sends the query result information to the first network device within first duration after the transceiving module 601 receives the control information.

Optionally, the processing module 602 is specifically configured to:

use the feedback information as the query result information.

Optionally, the feedback information further includes:

first time information used for instructing the first network device to send the control information next time.

Optionally, the feedback information includes:

second time information used for indicating an available time of the first spectrum.

Optionally, the second time information includes:

a start moment T1 at which the first spectrum is available, available duration D1 for which the first spectrum is available starting from the start moment T1, and unavailable duration D2 for which the first spectrum is unavailable starting from an end moment of the available duration D1.

Optionally, the feedback information includes:

frequency information used for indicating an available frequency on the first spectrum.

Optionally, the frequency information includes:

a carrier identifier of an available carrier on the first spectrum; or a carrier bitmap, where the carrier bitmap is used for indicating whether each carrier on the first spectrum is available.

Optionally, if the control information includes the configuration information and the activation information, the transceiving module 601 is further configured to: before the terminal receives the activation information, receive a first receive threshold sent by the first network device; and the transceiving module 601 is specifically configured to receive the activation information when a difference between strength of a received signal that is transmitted by the first network device and strength of a signal that is transmitted by the second network device and that is received on the first spectrum is less than the first receive threshold.

Optionally, if the control information includes the configuration information, the transceiving module 601 is further configured to: before receiving the configuration information, receive a second receive threshold sent by the first network device; and the transceiving module 601 is specifically configured to receive the configuration information when the following condition is met:

a difference between strength of a signal that is transmitted by the first network device and that is received by the terminal and strength of a signal that is transmitted by the second network device and that is received on the first spectrum is less than the second receive threshold.

Optionally, the transceiving module 601 is specifically configured to:

receive the control information, and determine that the control information is identified by a first identifier of the terminal.

The first identifier is used for indicating the terminal, and the control information is sent to the terminal and is used for instructing the terminal to access the second network device and query whether the second network device allows the first network device to use the first spectrum.

Optionally, if the control information includes the configuration information and the activation information, the transceiving module 601 is specifically configured to: receive the activation information on a physical downlink control channel, descramble CRC information in the activation information by using the first identifier of the terminal, and if the descrambling succeeds, determine that the activation information is identified by the first identifier of the terminal.

Optionally, if the control information includes the configuration information, the transceiving module 601 is specifically configured to: receive the configuration information on a physical downlink control channel, descramble CRC information in the configuration information by using the first identifier of the terminal, and if the descrambling succeeds, determine that the configuration information is identified by the first identifier of the terminal.

Optionally, the configuration information further includes a network device identifier that is of the second network device and that is used for instructing the terminal to access a network device identified by the network device identifier.

Optionally, the transceiving module 601 is specifically configured to:

receive the feedback information sent by the second network device by using an access response message.

Embodiment 5

FIG. 7 is a schematic structural diagram of a second type of terminal according to Embodiment 5 of the present invention. As shown in FIG. 7, the terminal includes:

a transceiver 701, configured to receive control information sent by a first network device; and a processor 702, configured to: according to the control information, access a second network device and query whether the second network device allows the first network device to use a first spectrum.

The transceiver 701 is further configured to receive feedback information returned by the second network device in response to the query.

The processor 702 is further configured to determine, according to the feedback information, whether the first network device is allowed to use the first spectrum; and/or the processor 702 is further configured to determine query result information of the query according to the feedback information, and the transceiver 701 is further configured to send the query result information determined by the processor 702 to the first network device.

The first spectrum is an unlicensed spectrum for the first network device.

Embodiment 6

FIG. 8 is a schematic structural diagram of a first type of second network device according to Embodiment 6 of the present invention. As shown in FIG. 8, the second network device includes:

a transceiving module 801, configured to detect that a terminal accesses the second network device and queries whether the second network device allows a first network device to use a first spectrum; and a processing module 802, configured to determine whether to allow the first network device to use the first spectrum.

The transceiving module 801 is further configured to send feedback information to the terminal in response to the query, where the feedback information is used for indicating whether the second network device allows the first network device to use the first spectrum.

The first spectrum is an unlicensed spectrum for the first network device.

Optionally, the processing module 802 is specifically configured to:

determine, according to an occupation factor of the second network device, whether to allow the first network device to use the first spectrum; or determine, according to an occupation factor of the second network device and an occupation factor of the first network device, whether to allow the first network device to use the first spectrum.

An occupation factor of a network device is in inverse proportion to duration of occupying the first spectrum by the network device, and is in direct proportion to spectrum efficiency of using the first spectrum by the network device.

Optionally, the processing module 802 is specifically configured to:

when a difference between the occupation factor of the second network device and the occupation factor of the first network device is less than a preset occupation factor difference threshold, determine to allow the first network device to use the first spectrum; or when a difference between the occupation factor of the second network device and the occupation factor of the first network device is not less than a preset occupation factor difference threshold, determine not to allow the first network device to use the first spectrum.

Optionally, the transceiving module 801 is further configured to:

before the processing module 802 determines whether to allow the first network device to use the first spectrum, receive the occupation factor that is of the first network device and that is sent by the first network device.

Optionally, the terminal accesses the second network device after receiving control information that is sent by the first network device and that is used for instructing the terminal to access the second network device and query whether the second network device allows the first network device to use the first spectrum.

The feedback information includes first time information used for instructing the first network device to send the control information next time.

Optionally, the feedback information includes second time information used for indicating an available time of the first spectrum.

Optionally, the second time information includes:

a start moment T1 at which the first spectrum is available, available duration D1 for which the first spectrum is available starting from the start moment T1, and unavailable duration D2 for which the first spectrum is unavailable starting from an end moment of the available duration D1.

Optionally, the feedback information includes:

frequency information used for indicating an available frequency on the first spectrum.

Optionally, the frequency information includes:

a carrier identifier of an available carrier on the first spectrum; or a carrier bitmap, where the carrier bitmap is used for indicating whether each carrier on the first spectrum is available.

Optionally, the transceiving module 801 is specifically configured to send the feedback information by using an access response message.

Embodiment 7

FIG. 9 is a schematic structural diagram of a second type of second network device according to Embodiment 7 of the present invention. As shown in FIG. 9, the second network device includes:

a transceiver 901, configured to detect that a terminal accesses the second network device and queries whether the second network device allows a first network device to use a first spectrum; and a processor 902, configured to determine whether to allow the first network device to use the first spectrum.

The transceiver 901 is further configured to send feedback information to the terminal in response to the query, where the feedback information is used for indicating whether the second network device allows the first network device to use the first spectrum.

The first spectrum is an unlicensed spectrum for the first network device.

Embodiment 8

FIG. 10 is a flowchart of a first method for determining availability of a communication spectrum according to Embodiment 8 of the present invention. As shown in FIG. 10, the method includes the following steps:

S1001: A first network device sends control information to a terminal, where the control information is used for instructing the terminal to access a second network device and query whether the second network device allows the first network device to use a first spectrum.

S1002: The first network device determines a query result of querying, by the terminal, whether the second network device allows the first network device to use the first spectrum.

S1003: The first network device determines, according to the query result, whether the first spectrum is available.

The first spectrum is an unlicensed spectrum for the first network device.

Optionally, the control information includes configuration information and activation information, the configuration information includes information about a physical resource and/or a physical signal used when the terminal accesses the second network device, and the activation information is used for instructing the terminal to access the second network device according to the configuration information; and that the first network device sends the control information to the terminal includes: the first network device sends the configuration information to the terminal, and then sends the activation information to the terminal when the first network device needs to use the first spectrum to communicate with the terminal; or the control information includes configuration information, and that the first network device sends the control information to the terminal includes: the first network device sends the configuration information to the terminal when the first network device needs to use the first spectrum to communicate with the terminal.

Optionally, the physical signal includes an access preamble Preamble.

Optionally, the information about the physical signal is pre-agreed between the first network device and the second network device, or is preconfigured in an operation and maintenance OAM manner and is notified to the first network device and the second network device.

Optionally, the configuration information further includes:

query result feedback manner information used for indicating whether a manner of feeding back the query result by the terminal is an explicit feedback manner or an implicit feedback manner.

Optionally, if the query result feedback manner information indicates that the manner of feeding back the query result by the terminal is an explicit feedback manner, that the first network device determines the query result includes:

the first network device receives query result information returned by the terminal; and the first network device determines the query result according to the query result information.

Optionally, if the query result feedback manner information indicates that the manner of feeding back the query result by the terminal is an implicit feedback manner, that the first network device determines the query result includes:

if the first network device does not receive, within first duration after sending the control information, query result information returned by the terminal, the first network device determines that the query result is that the first spectrum is available to the first network device; or if the first network device receives, within first duration after sending the control information, query result information returned by the terminal, and the query result information indicates that the first network device is not allowed to use the first spectrum, the first network device determines that the query result is that the first spectrum is unavailable to the first network device.

Optionally, if the first network device determines that the first spectrum is unavailable, the query result information includes:

first time information used for instructing the first network device to send the control information next time.

Optionally, the query result information includes:

second time information used for indicating an available time of the first spectrum.

Optionally, the second time information includes:

a start moment T1 at which the first spectrum is available, available duration D1 for which the first spectrum is available starting from the start moment T1, and unavailable duration D2 for which the first spectrum is unavailable starting from an end moment of the available duration D1.

That the first network device determines the query result according to the query result information includes:

the first network device determines that the first spectrum is available within the duration D1 starting from the start moment T1 and that the first spectrum is unavailable within the duration D2 following the duration D1, where D1+D2 is a cycle.

Optionally, the query result information includes:

frequency information used for indicating an available frequency on the first spectrum.

Optionally, the frequency information includes:

a carrier identifier of an available carrier on the first spectrum; or a carrier bitmap, where the carrier bitmap is used for indicating whether each carrier on the first spectrum is available.

Optionally, if the control information includes the configuration information and the activation information, before the activation information is sent, the method further includes:

a first receive threshold is sent to the terminal, where the first receive threshold is used for instructing the terminal to receive the activation information when the following condition is met:

a difference between strength of a received signal that is transmitted by the first network device and strength of a signal that is transmitted by the second network device and that is received on the first spectrum is less than the first receive threshold.

Optionally, if the control information includes the configuration information, before the configuration information is sent, the method further includes:

a second receive threshold is sent to the terminal, where the second receive threshold is used for instructing the terminal to receive the configuration information when the following condition is met:

a difference between strength of a received signal that is transmitted by the first network device and strength of a signal that is transmitted by the second network device and that is received on the first spectrum is less than the second receive threshold.

Optionally, that the first network device sends the control information to the terminal includes:

the first network device sends the control information to the terminal, and identifies the control information by using a first identifier of the terminal.

The first identifier is used for indicating the terminal, and the control information is sent to the terminal and is used for instructing the terminal to access the second network device and query whether the second network device allows the first network device to use the first spectrum.

Optionally, if the control information includes the configuration information and the activation information, that the first network device sends the activation information to the terminal includes: the first network device sends the activation information on a physical downlink control channel;

and that the first network device identifies the control information by using the first identifier of the terminal includes:

the first network device scrambles cyclic redundancy check CRC information in the activation information by using the first identifier of the terminal.

Optionally, if the control information includes the configuration information, that the first network device sends the configuration information to the terminal includes: the first network device sends the configuration information on a physical downlink control channel; and that the first network device identifies the control information by using the first identifier of the terminal includes:

the first network device scrambles CRC information in the configuration information by using the first identifier of the terminal.

Optionally, the configuration information further includes a network device identifier that is of the second network device and that is used for instructing the terminal to access a network device identified by the network device identifier.

Optionally, the method further includes: the first network device sends an occupation factor of the first network device to the second network device, and instructs the second network device to determine, according to an occupation factor of the second network device and the occupation factor of the first network device, whether to allow the first network device to use the first spectrum.

An occupation factor of a network device is in inverse proportion to duration of occupying the first spectrum by the network device, and is in direct proportion to spectrum efficiency of using the first spectrum by the network device.

Embodiment 9

FIG. 11 is a flowchart of a second method for determining availability of a communication spectrum according to Embodiment 9 of the present invention. As shown in FIG. 11, the method includes the following steps:

S1101: A terminal receives control information sent by a first network device.

S1102: According to the control information, the terminal accesses a second network device and queries whether the second network device allows the first network device to use a first spectrum.

S1103: The terminal receives feedback information returned by the second network device in response to the query.

S1104: The terminal determines, according to the feedback information, whether the first network device is allowed to use the first spectrum; and/or the terminal determines query result information of the query according to the feedback information, and sends the determined query result information to the first network device.

The first spectrum is an unlicensed spectrum for the first network device.

Optionally, the control information includes configuration information and activation information, the configuration information includes information about a physical resource and/or a physical signal used when the terminal accesses the second network device, and the activation information is used for instructing the terminal to access the second network device according to the configuration information; and that the terminal receives the control information, and accesses the second network device according to the control information includes: the terminal receives and stores the configuration information, and accesses the second network device according to the configuration information after receiving the activation information; or the control information includes configuration information, and that the terminal receives the control information, and accesses the second network device according to the control information includes: the terminal receives the configuration information, and accesses the second network device according to the configuration information.

Optionally, the physical signal includes an access preamble Preamble.

Optionally, the information about the physical signal is pre-agreed between the first network device and the second network device, or is preconfigured in an operation and maintenance OAM manner and is notified to the first network device and the second network device.

Optionally, the configuration information further includes:

query result feedback manner information used for indicating whether a manner of feeding back a query result by the terminal is an explicit feedback manner or an implicit feedback manner.

Optionally, if the query result feedback manner information indicates that the manner of feeding back the query result by the terminal is an explicit feedback manner, the terminal determines the query result information of the query according to the feedback information, and sends the deters lined query result information to the first network device.

Optionally, if the query result feedback manner information indicates that the manner of feeding back the query result by the terminal is an implicit feedback manner, the terminal determines, according to the feedback information, whether the first network device is allowed to use the first spectrum; and if the terminal determines that the first network device is allowed to use the first spectrum, as for whether the first network device is allowed to use the first spectrum, the terminal remains silent to the first network device and does not send information to the first network device within first duration after the first network device sends the control information; or if the terminal determines that the first network device is not allowed to use the first spectrum, the terminal determines the query result information of the query according to the feedback information, and sends the query result information to the first network device within first duration after the terminal receives the control information.

Optionally, that the terminal determines the query result information according to the feedback information includes:

the terminal uses the feedback information as the query result information.

Optionally, the feedback information further includes:

first time information used for instructing the first network device to send the control information next time.

Optionally, the feedback information includes:

second time information used for indicating an available time of the first spectrum.

Optionally, the second time information includes:

a start moment T1 at which the first spectrum is available, available duration D1 for which the first spectrum is available starting from the start moment T1, and unavailable duration D2 for which the first spectrum is unavailable starting from an end moment of the available duration D1.

Optionally, the feedback information includes:

frequency information used for indicating an available frequency on the first spectrum.

Optionally, the frequency information includes:

a carrier identifier of an available carrier on the first spectrum; or a carrier bitmap, where the carrier bitmap is used for indicating whether each carrier on the first spectrum is available.

Optionally, if the control information includes the configuration information and the activation information, before the terminal receives the activation information, the method further includes:

the terminal receives a first receive threshold sent by the first network device; and that the terminal receives the activation information includes:

the terminal receives the activation information when a difference between strength of a received signal that is transmitted by the first network device and strength of a signal that is transmitted by the second network device and that is received on the first spectrum is less than the first receive threshold.

Optionally, if the control information includes the configuration information, before the terminal receives the configuration information, the method further includes:

the terminal receives a second receive threshold sent by the first network device; and that the terminal receives the configuration information includes: the terminal receives the configuration information when the following condition is met:

a difference between strength of a signal that is transmitted by the first network device and that is received by the terminal and strength of a signal that is transmitted by the second network device and that is received on the first spectrum is less than the second receive threshold.

Optionally, that the control information is received includes:

the control information is received, and it is determined that the control information is identified by a first identifier of the terminal.

The first identifier is used for indicating the terminal, and the control information is sent to the terminal and is used for instructing the terminal to access the second network device and query whether the second network device allows the first network device to use the first spectrum.

Optionally, if the control information includes the configuration information and the activation information, that the terminal receives the activation information includes: the terminal receives the activation information on a physical downlink control channel; and that the terminal determines that the control information is identified by the first identifier of the terminal includes:

the terminal descrambles CRC information in the activation information by using the first identifier of the terminal, and if the descrambling succeeds, determines that the activation information is identified by the first identifier of the terminal.

Optionally, if the control information includes the configuration information, that the terminal receives the configuration information includes: the terminal receives the configuration information on a physical downlink control channel; and that the terminal determines that the control information is identified by the first identifier of the terminal includes:

the terminal descrambles CRC information in the configuration information by using the first identifier of the terminal, and if the descrambling succeeds, determines that the configuration information is identified by the first identifier of the terminal.

Optionally, the configuration information further includes a network device identifier that is of the second network device and that is used for instructing the terminal to access a network device identified by the network device identifier.

Optionally, that the terminal receives the feedback information includes: the terminal receives the feedback information sent by the second network device by using an access response message.

Embodiment 10

FIG. 12 is a flowchart of a third method for determining availability of a communication spectrum according to Embodiment 10 of the present invention. As shown in FIG. 12, the method includes the following steps:

S1201: A second network device detects that a terminal accesses the second network device and queries whether the second network device allows a first network device to use a first spectrum.

S1202: The second network device determines whether to allow the first network device to use the first spectrum.

S1203: The second network device sends feedback information to the terminal in response to the query, where the feedback information is used for indicating whether the second network device allows the first network device to use the first spectrum.

The first spectrum is an unlicensed spectrum for the first network device.

Optionally, that the second network device determines whether to allow the first network device to use the first spectrum includes:

the second network device determines, according to an occupation factor of the second network device, whether to allow the first network device to use the first spectrum; or the second network device determines, according to an occupation factor of the second network device and an occupation factor of the first network device, whether to allow the first network device to use the first spectrum.

An occupation factor of a network device is in inverse proportion to duration of occupying the first spectrum by the network device, and is in direct proportion to spectrum efficiency of using the first spectrum by the network device.

Optionally, that the second network device determines, according to the occupation factor of the second network device and the occupation factor of the first network device, whether to allow the first network device to use the first spectrum includes:

when a difference between the occupation factor of the second network device and the occupation factor of the first network device is less than a preset occupation factor difference threshold, the second network device determines to allow the first network device to use the first spectrum; or when a difference between the occupation factor of the second network device and the occupation factor of the first network device is not less than a preset occupation factor difference threshold, the second network device determines not to allow the first network device to use the first spectrum.

Optionally, before the second network device determines whether to allow the first network device to use the first spectrum, the method further includes:

the second network device receives the occupation factor that is of the first network device and that is sent by the first network device.

Optionally, the terminal accesses the second network device after receiving control information that is sent by the first network device and that is used for instructing the terminal to access the second network device and query whether the second network device allows the first network device to use the first spectrum.

The feedback information includes first e information nation used for instructing the first network device to send the control information next time.

Optionally, the feedback information includes:
second time information used for indicating an available time of the first spectrum.

Optionally, the second time information includes:
a start moment T1 at which the first spectrum is available, available duration D1 for which the first spectrum is available starting from the start moment T1, and unavailable duration D2 for which the first spectrum is unavailable starting from an end moment of the available duration D1.

Optionally, the feedback information includes:
frequency information used for indicating an available frequency on the first spectrum.

Optionally, the frequency information includes:
a carrier identifier of an available carrier on the first spectrum; or
a carrier bitmap, where the carrier bitmap is used for indicating whether each carrier on the first spectrum is available.

Optionally, that the second network device sends the feedback information includes: the second network device sends the feedback information by using an access response message.

With reference to Embodiment 11 to Embodiment 17, the following describes a wireless communications system B provided in embodiments of the present invention, and a network device, a terminal, and a method for performing communication on an unlicensed spectrum that are applicable to the wireless communications system B.

Embodiment 11

Embodiment 11 provides a wireless communications system B.

As shown in FIG. 13, the wireless communications system B includes a first network device 1301, a terminal 1302, and a second network device 1303.

The first network device 1301 is configured to: send control information to the terminal 1302, where the control information is used for instructing the terminal 1302 to access the second network device 1303 and instruct the second network device 1303 to stop using a first spectrum; and after sending the foregoing control information, use the first spectrum to perform communication.

The terminal 1302 is configured to: receive the foregoing control information sent by the first network device 1301; and according to the control information, access the second network device 1303 and instruct the second network device 1303 to stop using the first spectrum.

The second network device 1303 is configured to stop using the first spectrum after receiving the foregoing notification from the terminal 1302.

The first spectrum is an unlicensed spectrum for the first network device 1301. The terminal 1302 is a terminal served by the first network device 1301.

With reference to a diagram of message exchange in FIG. 14, the following describes message exchange between devices in the wireless communications system B. In FIG. 14, the following steps are included:

S1401: The first network device 1301 sends control information to the terminal 1302, to instruct the terminal 1302 to access the second network device 1303 and instruct the second network device 1303 to stop using a first spectrum.

S1402: The terminal 1302 accesses the second network device 1303 and instructs the second network device 1303 to listen to information using the first spectrum.

S1403: The second network device 1303 stops using the first spectrum.

S1404: The first network device 1301 uses the first spectrum to perform communication.

The first network device 1301 may use the first spectrum immediately after sending the control information, or after sending the control information, may use the first spectrum after a delay of first time, to ensure that the second network device 1303 already stops using the first spectrum. Therefore, step S1404 may be performed before or after step S1403 according to the foregoing different implementation.

For solutions in which the first network device 1301 sends the foregoing control information to the terminal 1302 in a specific condition, the first network device 1301 identifies the control information, and the first network device 1301 sends configuration information in the control information, refer to implementation of the first network device 201 and the terminal 202 in Embodiment 1. Details are not repeatedly described herein.

For example, in the wireless communications system B, the control information may include configuration information and activation information, the configuration information includes information about a physical resource and/or a physical signal used when the terminal 1302 accesses the second network device 1303, and the activation information is used for instructing the terminal 1302 to access the second network device 1303 according to the foregoing configuration information; and the first network device 1301 sends the foregoing configuration information to the terminal 1302, and then sends the foregoing activation information to the terminal 1302 when the first network device 1301 needs to use the first spectrum, for example, when the first network device 1301 needs to use the first spectrum to communicate with the terminal 1302; or the control information includes the foregoing configuration information, and the first network device 1301 sends the foregoing configuration information to the terminal 1302 when the first network device 1301 needs to use the first spectrum, for example, when the first network device 1301 needs to use the first spectrum to communicate with the terminal 1302.

Further, optionally, the information about the physical resource in the configuration information may include related information, such as a frequency, a timeslot, and/or a symbol, of a physical channel used when the terminal 1302 accesses the second network device 1303. The physical signal in the foregoing configuration information may include an access preamble Preamble.

In the wireless communications system B provided in Embodiment 11, when the first network device 1301 needs to use the first spectrum, the terminal 1302 instructs the second network device 1303 to stop using the first spectrum, thereby effectively avoiding interference from the second network device 1303 caused when the first network device 1301 uses the first spectrum.

In Embodiment 11, the first network device 1301 may add absolute priority information to the control information. The absolute priority information is used for instructing the terminal 1302 to instruct the second network device 1303 to stop using the first spectrum, instead of querying whether the second network device 1303 allows the first network device 1301 to use the first spectrum.

Optionally, the information about the physical signal may be pre-agreed between the first network device 1301 and the second network device 1303, or the information about the physical signal is preconfigured in an OAM manner and is notified to each of the first network device 1301 and the second network device 1303. In this way, when detecting that the terminal 1302 accesses the second network device 1303 by using the foregoing agreed or preconfigured physical signal, the second network device 1303 determines that the second network device 1303 needs to stop using the first spectrum.

Based on an invention concept same as that in Embodiment 11, Embodiment 12 to Embodiment 17 separately provide a first network device, a terminal, and a method for performing communication on an unlicensed spectrum. The network device, the terminal, and the method are applicable to the wireless communications system B provided in Embodiment 11. For specific implementation thereof, refer to the description in Embodiment 11. Details are not repeatedly described herein.

Embodiment 12

FIG. 15 is a schematic structural diagram of a third type of first network device according to Embodiment 12 of the present invention. As shown in FIG. 15, the first network device includes:

a transceiving module 1501, configured to send control information to a terminal, where the control information is used for instructing the terminal to access a second network device and instruct the second network device to stop using a first spectrum; and a processing module 1502, configured to: after the transceiving module 1501 sends the control information, use the first spectrum to perform communication.

The first spectrum is an unlicensed spectrum for the first network device.

Optionally, the control information includes configuration information and activation information, the configuration information includes information about a physical resource and/or a physical signal used when the terminal accesses the second network device, and the activation information is used for instructing the terminal to access the second network device according to the configuration information; and the transceiving module 1501 is specifically configured to: send the configuration information to the terminal, and then send the activation information to the terminal when the first network device needs to use the first spectrum to communicate with the terminal; or the control information includes configuration information, and the transceiving module 1501 is specifically configured to send the configuration information to the terminal when the first network device needs to use the first spectrum to communicate with the terminal.

Optionally, the physical signal includes an access preamble Preamble.

Embodiment 13

FIG. 16 is a schematic structural diagram of a fourth type of first network device according to Embodiment 13 of the present invention. As shown in FIG. 16, the first network device includes:

a transceiver 1601, configured to send control information to a terminal, where the control information is used for instructing the terminal to access a second network device and instruct the second network device to stop using a first spectrum; and a processor 1602, configured to: after the transceiver 1601 sends the control information, use the first spectrum to perform communication.

The first spectrum is an unlicensed spectrum for the first network device.

Embodiment 14

FIG. 17 is a schematic structural diagram of a third type of terminal according to Embodiment 14 of the present invention. As shown in FIG. 17, the terminal includes:

a transceiving module 1701, configured to receive control information sent by a first network device, where the control information is used for instructing the terminal to access a second network device and instruct the second network device to stop using a first spectrum; and a processing module 1702, configured to: according to the control information, access the second network device and instruct the second network device to stop using the first spectrum.

The first spectrum is an unlicensed spectrum for the first network device.

Optionally, the control information includes configuration information and activation information, the configuration information includes information about a physical resource and/or a physical signal used when the terminal accesses the second network device, and the activation information is used for instructing the terminal to access the second network device according to the configuration information; the transceiving module 1701 is specifically configured to receive and store the configuration information; and the processing module 1702 is specifically configured to access the second network device according to the configuration information after the transceiving module 1701 receives the activation information; or the control information includes configuration information, and the processing module 1702 is specifically configured to access the second network device according to the configuration information received by the transceiving module 1701.

Optionally, the physical signal includes an access preamble Preamble.

Embodiment 15

FIG. 18 is a schematic structural diagram of a fourth type of terminal according to Embodiment 15 of the present invention. As shown in FIG. 18, the terminal includes:

a transceiver 1801, configured to receive control information sent by a first network device, where the control information is used for instructing the terminal to access a second network device and instruct the second network device to stop using a first spectrum; and a processor 1802, configured to: according to the control information, access the second network device and instruct the second network device to stop using the first spectrum.

The first spectrum is an unlicensed spectrum for the first network device.

Embodiment 16

FIG. 19 is a flowchart of a first method for performing communication on an unlicensed spectrum according to Embodiment 16 of the present invention. As shown in FIG. 19, the method includes the following steps:

S1901: A first network device sends control information to a terminal, where the control information is used for instructing the terminal to access a second network device and instruct the second network device to stop using a first spectrum.

S1902: After sending the control information, the first network device uses the first spectrum to perform communication.

The first spectrum is an unlicensed spectrum for the first network device.

Optionally, the control information includes configuration information and activation information, the configuration information includes information about a physical resource and/or a physical signal used when the terminal accesses the second network device, and the activation information is used for instructing the terminal to access the second network device according to the configuration information; and that the first network device sends the control information to the terminal includes: the first network device sends the configuration information to the terminal, and then sends the activation information to the terminal when the first network device needs to use the first spectrum to communicate with the terminal; or the control information includes configuration information, and that the first network device sends the control information to the terminal includes: the first network device sends the configuration information to the terminal when the first network device needs to use the first spectrum to communicate with the terminal.

Optionally, the physical signal includes an access preamble Preamble.

Embodiment 17

FIG. 20 is a flowchart of a second method for performing communication on an unlicensed spectrum according to Embodiment 17 of the present invention. As shown in FIG. 20, the method includes the following steps:

S2001: A terminal receives control information sent by a first network device, where the control information is used for instructing the terminal to access a second network device and instruct the second network device to stop using a first spectrum.

S2002: According to the control information, the terminal accesses the second network device and instructs the second network device to stop using the first spectrum.

The first spectrum is an unlicensed spectrum for the first network device.

Optionally, the control information includes configuration information and activation information, the configuration information includes information about a physical resource and/or a physical signal used when the terminal accesses the second network device, and the activation information is used for instructing the terminal to access the second network device according to the configuration information; and that the terminal receives the control information, and accesses the second network device according to the control information includes: the terminal receives and stores the configuration information, and accesses the second network device according to the configuration information after receiving the activation information; or the control information includes configuration information, and that the terminal receives the control information, and accesses the second network device according to the control information includes: the terminal receives the configuration information, and accesses the second network device according to the configuration information.

Optionally, the physical signal includes an access preamble Preamble.

In this embodiment of the present invention, when a first network device needs to use an unlicensed first spectrum, the first network device uses a terminal to query whether a second network device allows the first network device to use the first spectrum, and uses the first spectrum when the second network device allows the first network device to use the first spectrum; or when a first network device needs to use a first spectrum, the first network device uses a terminal to instruct a second network device to stop using the first spectrum. In this way, interference from the second network device on the first spectrum is effectively avoided.

Persons skilled in the art should understand that the embodiments of the present invention may be provided as a method, a system, or a computer program product. Therefore, the present invention may use a than of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A method for determining availability of a communication spectrum, comprising:
   receiving, by a terminal, control information sent by a first network device;
   according to the control information, accessing, by the terminal, a second network device and querying whether the second network device allows the first network device to use a first spectrum;
   receiving, by the terminal, feedback information returned by the second network device in response to the query, wherein the feedback information is based on an occupation factor of the first spectrum by the second network device, wherein the occupation factor of the first spectrum by the second network device is in inverse proportion to duration of occupying the first spectrum by the second network device, and is in direct proportion to spectrum efficiency of using the first spectrum by the second network device;
   determining, by the terminal, query result information of the query according to the feedback information; and
   sending, by the terminal, the determined query result information to the first network device;
   wherein the first spectrum is an unlicensed spectrum for the first network device.

2. The method according to claim 1, wherein the control information comprises configuration information and activation information, the configuration information comprises at least one of information about a physical resource or a physical signal used when the terminal accesses the second network device, and the activation information is for instructing the terminal to access the second network device according to the configuration information; and
   receiving the control information, and accessing the second network device according to the control information comprises:
      receiving and storing, by the terminal, the configuration information, and accessing the second network device according to the configuration information after receiving the activation information; or
   the control information comprises the configuration information, and receiving the control information, and accessing the second network device according to the control information comprises:
      receiving, by the terminal, the configuration information, and accessing the second network device according to the configuration information.

3. The method according to claim 2, wherein the configuration information further comprises:
   query result feedback manner information for indicating whether a manner of feeding back a query result by the terminal is an explicit feedback manner or an implicit feedback manner;
   wherein when the query result feedback manner information indicates that the manner of feeding back the query result by the terminal is an explicit feedback manner, the terminal determines the query result information of the query according to the feedback information, and sends the determined query result information to the first network device.

4. The method according to claim 2, wherein receiving the control information comprises:

receiving the control information, and determining that the control information is identified by a first identifier of the terminal,
wherein the first identifier is for indicating the terminal, and the control information is sent to the terminal and is for instructing the terminal to access the second network device and query whether the second network device allows the first network device to use the first spectrum.

5. The method according to claim 2, wherein the configuration information further comprises:
a network device identifier that is of the second network device and that is for instructing the terminal to access a network device identified by the network device identifier.

6. The method according to claim 3, wherein the terminal determining the query result information according to the feedback information comprises:
using, by the terminal, the feedback information as the query result information.

7. The method according to claim 6, wherein the feedback information further comprises:
first time information for instructing the first network device to send the control information a next time.

8. The method according to claim 6, wherein the feedback information comprises:
second time information for indicating an available time of the first spectrum.

9. The method according to claim 6, wherein the feedback information comprises:
frequency information for indicating an available frequency on the first spectrum.

10. A method for determining availability of a communication spectrum, comprising:
detecting, by a second network device, that a terminal accesses the second network device and queries whether the second network device allows a first network device to use a first spectrum;
determining, by the second network device according to an occupation factor of the first spectrum by the second network device, whether to allow the first network device to use the first spectrum, wherein the occupation factor of the first spectrum by the second network device is in inverse proportion to duration of occupying the first spectrum by the second network device, and is in direct proportion to spectrum efficiency of using the first spectrum by the second network device; and
sending, by the second network device, feedback information to the terminal in response to the query, wherein the feedback information is for indicating whether the second network device allows the first network device to use the first spectrum;
wherein the first spectrum is an unlicensed spectrum for the first network device.

11. The method according to claim 10, wherein determining, by the second network device according to an occupation factor of the first spectrum by the second network device, whether to allow the first network device to use the first spectrum comprises:

determining, by the second network device according to the occupation factor of the first spectrum by the second network device and an occupation factor of the first spectrum by the first network device, whether to allow the first network device to use the first spectrum,
wherein an occupation factor of a network device is in inverse proportion to duration of occupying the first spectrum by the network device, and is in direct proportion to spectrum efficiency of using the first spectrum by the network device.

12. The method according to claim 10, wherein:
the terminal accesses the second network device after receiving control information that is sent by the first network device and that is for instructing the terminal to access the second network device and query whether the second network device allows the first network device to use the first spectrum; and
the feedback information comprises first time information for instructing the first network device to send the control information a next time.

13. The method according to claim 10, wherein the feedback information comprises:
second time information for indicating an available time of the first spectrum.

14. The method according to claim 10, wherein the feedback information comprises:
frequency information for indicating an available frequency on the first spectrum.

15. The method according to claim 11, wherein determining, by the second network device according to the occupation factor of the first spectrum by the second network device and an occupation factor of the first spectrum by the first network device, whether to allow the first network device to use the first spectrum comprises:
when a difference between the occupation factor of the first spectrum by the second network device and the occupation factor of the first spectrum by the first network device is less than a preset occupation factor difference threshold, determining, by the second network device, to allow the first network device to use the first spectrum; or
when a difference between the occupation factor of the first spectrum by the second network device and the occupation factor of the first spectrum by the first network device is not less than a preset occupation factor difference threshold, determining, by the second network device, not to allow the first network device to use the first spectrum.

16. The method according to claim 11, wherein before determining, by the second network device, whether to allow the first network device to use the first spectrum, the method further comprises:
receiving, by the second network device, the occupation factor of the first spectrum that is by the first network device and that is sent by the first network device.

* * * * *